(12) United States Patent
Lin et al.

(10) Patent No.: US 9,174,516 B2
(45) Date of Patent: Nov. 3, 2015

(54) ADJUSTABLE SUN VISOR SYSTEM FOR VEHICLE WINDSHIELD AND SIDE WINDOW

(71) Applicants: Der-Gao Lin, Austin, TX (US);
Wonchon Lin, Austin, TX (US);
Won-Yi Lin, Austin, TX (US); Liao Yu-Hua Lin, Austin, TX (US)

(72) Inventors: Der-Gao Lin, Austin, TX (US);
Wonchon Lin, Austin, TX (US);
Won-Yi Lin, Austin, TX (US); Liao Yu-Hua Lin, Austin, TX (US)

( * ) Notice: Subject to any disclaimer, the term of this patent is extended or adjusted under 35 U.S.C. 154(b) by 0 days.

(21) Appl. No.: 13/849,144

(22) Filed: Mar. 22, 2013

(65) Prior Publication Data
US 2014/0284958 A1 Sep. 25, 2014

(51) Int. Cl.
*B60J 3/00* (2006.01)
*B60J 3/02* (2006.01)

(52) U.S. Cl.
CPC ............. *B60J 3/0208* (2013.01); *B60J 3/0204* (2013.01)

(58) Field of Classification Search
USPC ..................... 296/97.1, 97.5, 97.6, 97.8, 97.9
See application file for complete search history.

(56) References Cited

U.S. PATENT DOCUMENTS

| | | | | |
|---|---|---|---|---|
| 2,965,415 A * | 12/1960 | Dryden | ..................... | 296/97.13 |
| 3,074,756 A * | 1/1963 | Howe | ......................... | 296/97.13 |
| 3,339,970 A * | 9/1967 | Jensen | ........................ | 296/97.13 |
| 4,666,205 A * | 5/1987 | Nakagawa | .................... | 296/97.6 |
| 4,681,363 A * | 7/1987 | Hemmeke et al. | ......... | 296/97.11 |
| 4,690,450 A * | 9/1987 | Boerema et al. | ............. | 296/97.9 |
| 4,925,232 A * | 5/1990 | Hemmeke et al. | .......... | 296/97.8 |
| 5,080,420 A * | 1/1992 | Hemmeke et al. | ........... | 296/97.1 |
| 5,421,632 A * | 6/1995 | Adomeit et al. | ............. | 296/97.9 |
| 5,810,421 A * | 9/1998 | Kalkman et al. | ............. | 296/97.5 |
| 8,033,313 B2 * | 10/2011 | Hansen | .................... | 160/370.22 |

* cited by examiner

*Primary Examiner* — Lori Lyjak

(57) ABSTRACT

A sun visor system includes multiple visors to provide selective window coverage for glare. This system can be employed on the driver side, passenger side, or both. The second visor (50), having pivotal device (56) on support rod (54), can be easily connected to the first visor (20) support rod (24) to provide pivotal movements between the windshield and side window. These visors, first and second, can be moved together or separately to stored positions, windshield and side window blocked positions, or combinations of both positions to provide window protection from glare quickly and easily for windshield, side window, or both. Also support rod of the visor can be made of flexible material, like gooseneck arm, to further provide flexible adjustments of visor to desired positions to block glare from different angles or positions of vehicle window. This adjustable visor system can be applied to a single sun visor system or multiple visors system.

24 Claims, 33 Drawing Sheets

ADJUSTABLE SUN VISOR SYSTEM FOR VEHICLE WINDSHIELD AND SIDE WINDOW

CROSS REFERENCE TO RELATED APPLICATIONS

Not Applicable

BACKGROUND OF THE INVENTION

1. Field of the Invention

The present invention relates to the sun visor system and more specifically to the adjustable sun visor system consisting of two visors, with a pivotal device on the second visor support rod connecting to first visor to provide selective window coverage for the windshield, the side window, or both, and with the support rod made of flexible material to further provide flexible adjustments of visor(s) to desired positions to block glare from different angles.

2. Description of Prior Art

Vehicles are equipped with a single sun visor to protect the driver or passenger from the sunlight or glare. Although this single visor can be moved to either the windshield blocking position or side window blocking position, it is not easy to change between these positions, and it is troublesome, inconvenient, and not safe to change frequently between these positions. There is a need to have a side window visor (second visor) to be used together with the single or first sun visor to block the light from the front windshield or side window, or both.

There are patents with side window sun visors or multiple sun visors, U.S. Pat. No. 6,039,381 to Kaluer, U.S. Pat. No. 5,421,632 to Adomeit. These visors need installation of extra brackets, or top and bottom clips, or nested pivotal mountings that are complicated to install and use.

Also the support rod of the visor is not flexible enough to adjust to cover the desired blocking positions for light coming from different angles. There is patent for dash mounting glare filter, U.S. Pat. No. 0,171,256 to Ward. Extra equipment, such as dashboard mounting glare filter, is required, and it is difficult to mount, install, and store for this reason. There is a need to have self-contained sun visor that can easily and flexibly be moved or bent to the desired blocking positions.

SUMMARY OF THE INVENTION

The objective of the present invention is to provide an easy and quick attachment of the second visor to the first or main visor to have personally selected window coverage for the windshield, side window, or both. The second visor with the pivotal device on one end of the support rod can be easily attached to the first visor support rod and provide pivotal movements between the windshield and side window. Both visors can be easily moved between the stored position, blocking position, and different combinations of stored positions and blocking positions for the first and second visors. The pivotal device can be a pivot socket, a circular device with an open end or non-open end, a hinge device, or other pivotal devices that attach to the first visor support rod to provide pivotal movements. This visor system can be employed on the driver side, passenger side, or both.

The other objective of the present invention is to have part of the visor support rod, multiple parts of visor support rod, or the whole visor support rod made of flexible material, such as gooseneck arm, to be able to flexibly adjust the visor to desired blocked positions to prevent glare from different angles. The adjustable visor with support rod made of flexible material can be employed to either a single visor system or multiple visor system. Further advantages of my invention will become apparent from a consideration of following drawings and specification.

DETAILED DESCRIPTION OF THE PREFERRED EMBODIMENTS

Figure 1:
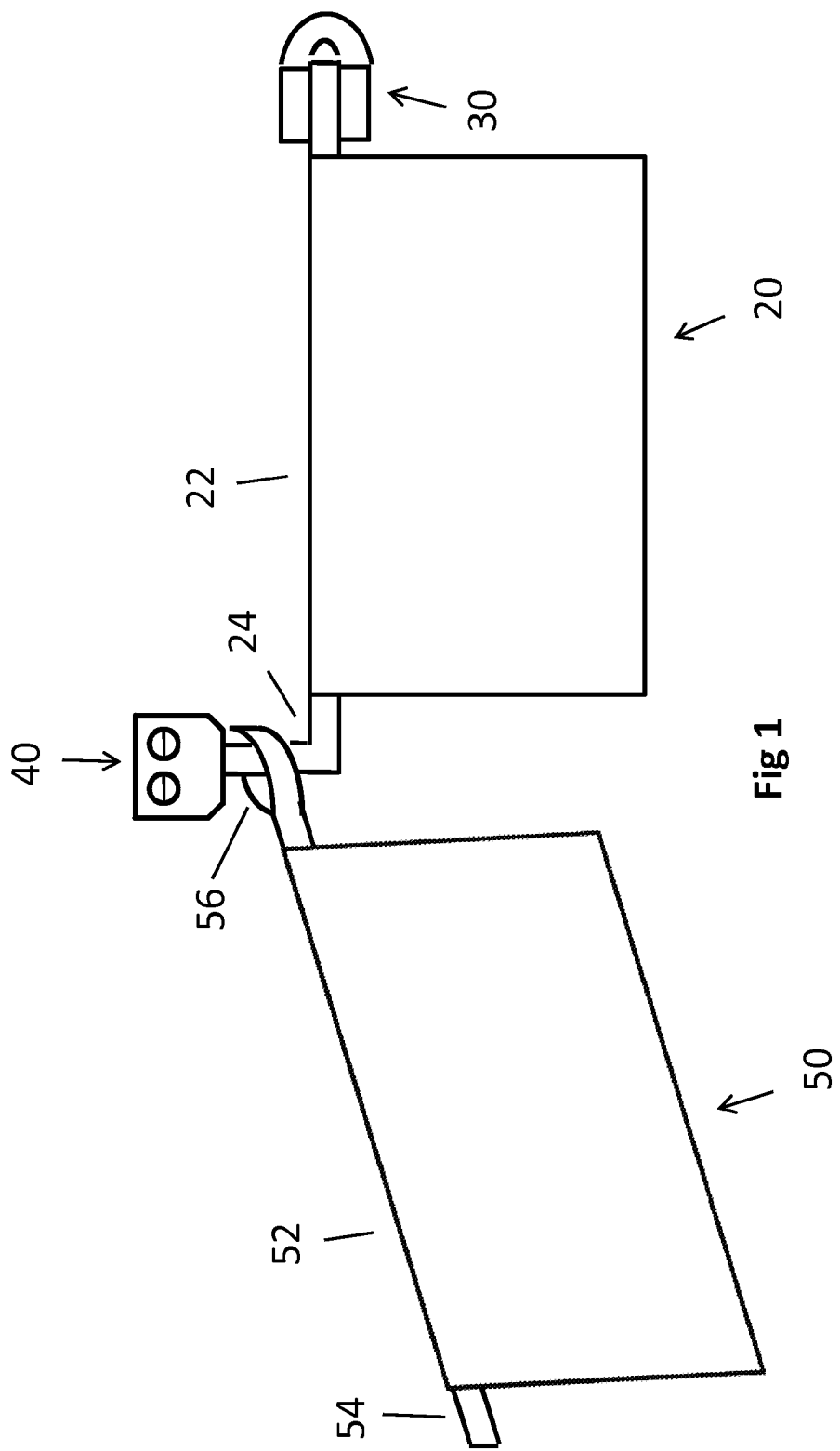
FIG. 1 is a perspective view of a first sun visor and second sun visor connected by pivotal device on second sun visor support.

With reference to FIG. 1, this is a perspective view of first visor 20 and second visor 50. First visor 20 has visor panel 22 and support rod 24. Support rod 24 is installed in the bracket 40 that can be freely rotated. The second visor 50 has visor panel 52 and support rod 54 with pivotal device 56. The first sun visor can be snapped into the socket 30. Support socket 70 (like socket 30 for the first visor) can be installed above the side window such that second visor can be snapped into the socket shown in FIG. 33 to keep second visor in position.

Second visor can be quickly and easily snapped in or connected to the first visor with the support rod pivotal device 56. The second visor pivotal device 56 can be easily rotated around the support rod 24 of first visor. The pivotal device 56 can be a semi-cylindrical pivot socket as shown in FIG. 1 that can snap in or attach to the first visor support rod 24. It can also be a circular device 58 with non open end (enclosed) shown in FIG. 10 or open end to snap in or open end to attach and enclose by screw or similar fastener device. It can also be a hinge device 59 shown in FIG. 11 or similar device to provide pivotal movements. For FIG. 10, the second visor with the circular device on support rod can be installed by removing the first visor support rod from the bracket 40, putting in second visor support rod and installing the first visor support rod back to the bracket. For FIG. 11, first visor and second visor are connected with hinge and can be installed together to the bracket 40.

Figure 2:
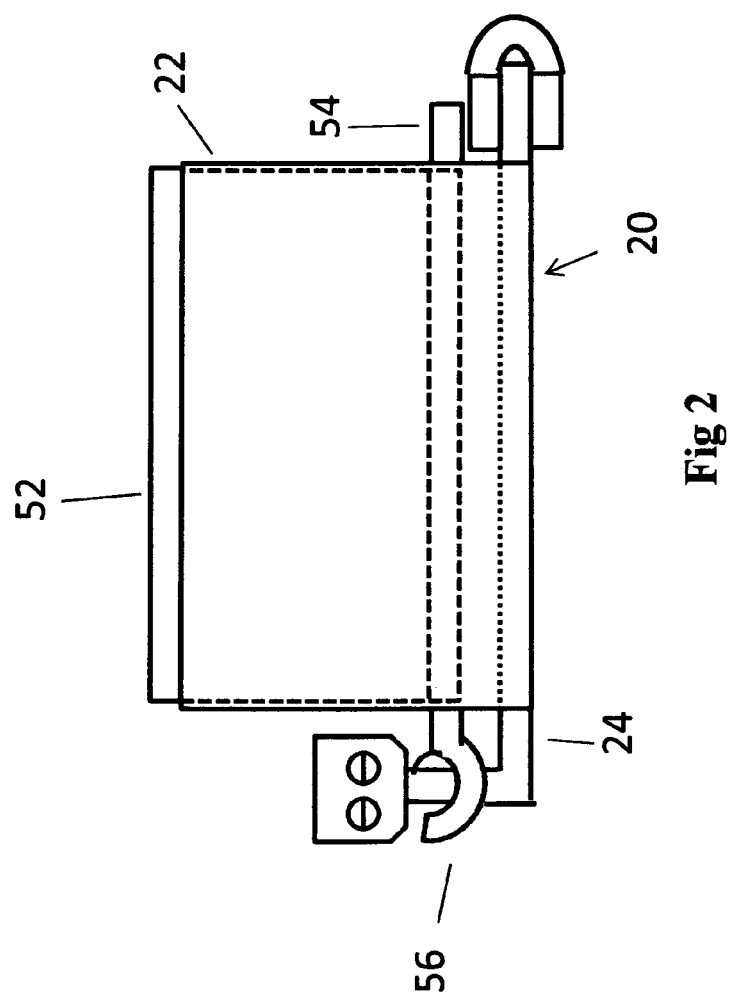
FIG. 2 shows the first sun visor and second sun visor both in the stored position above the windshield.
Figure 3:
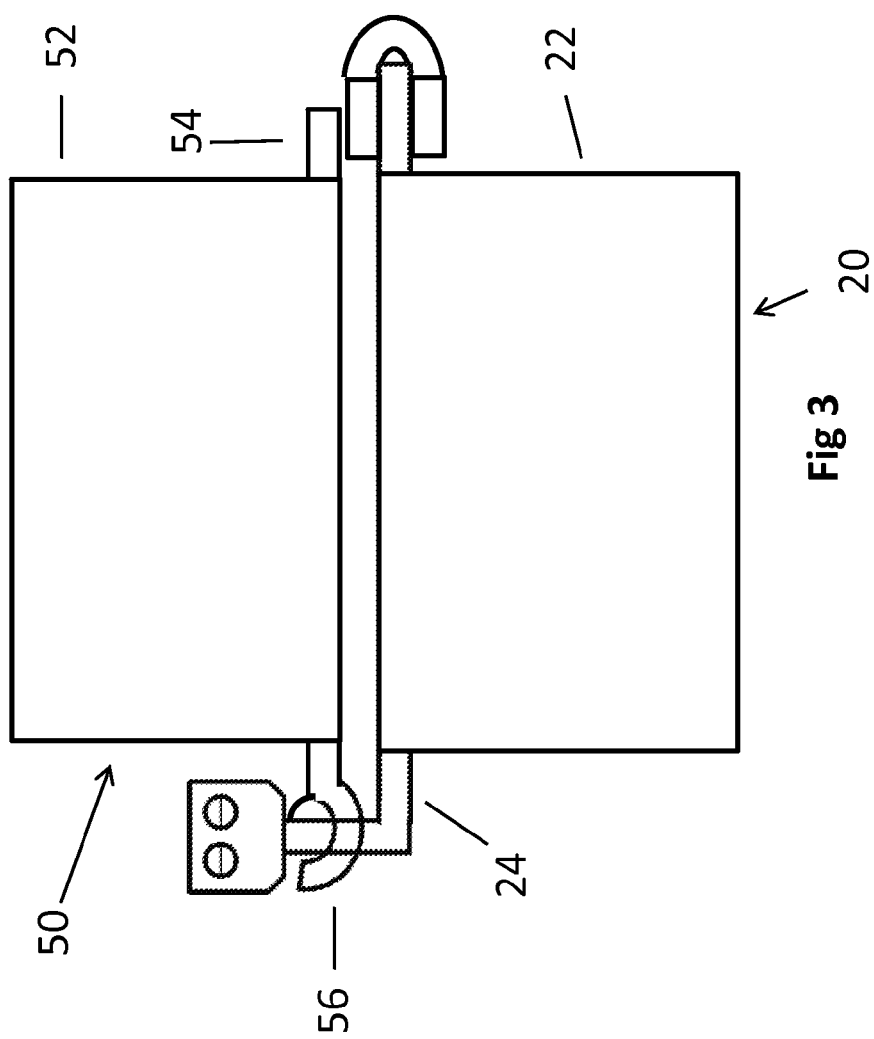
FIG. 3 shows the first sun visor in blocked position to block glare from the windshield and the second sun visor in the stored position above the windshield.
Figure 4:
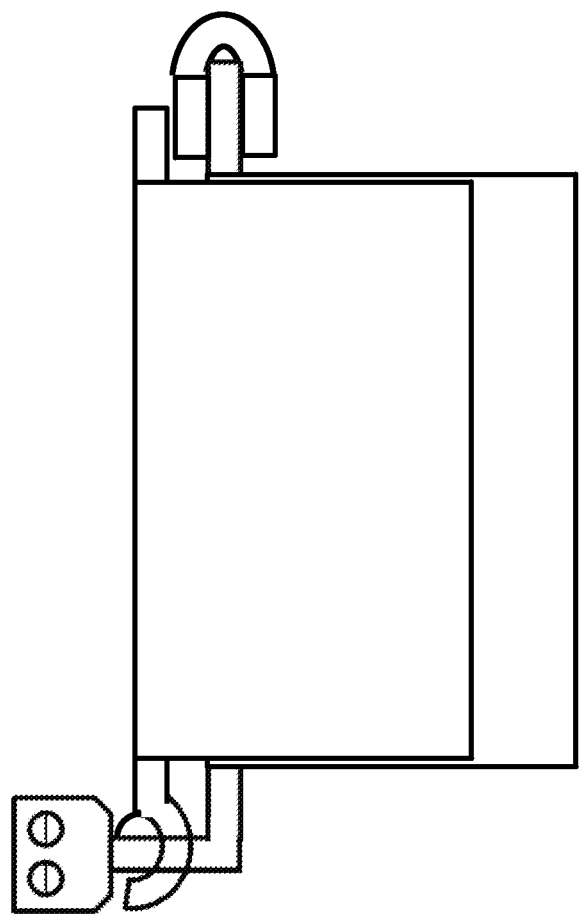
FIG. 4 shows the first sun visor and second sun visor both in the blocked position to prevent glare from windshield.

FIG. 2 to FIG. 8 show that the second visor 50 with pivotal support rod 54 attached to first visor support rod 24 can be moved separately or together with first visor 20 to stored positions, used (blocked) positions, or combinations of both positions. FIG. 2 shows both the first sun visor 20 and the second sun visor 50 in the store position above the windshield. Both visors can be easily stored in the stored position. Second visor 50 can be stored inside of main visor 20 or outside of main visor 20. An offset leg for the second visor support rod can be added to compensate for the thickness of the first visor panel. FIG. 2, FIG. 3, and FIG. 4 are shown with the second visor 50 inside the first visor 20.

FIG. 3 shows that the first sun visor 20 can be moved from the stored position to the blocked position (without moving the second sun visor) by flipping visor panel 22 down to block glare from the windshield. FIG. 4 shows both the first visor 20 and second visor 50 can be moved together (flipping both first visor and second visor panels together) or separately (flipping visor panel 22 first and then flipping second visor panel 52) to the blocked position. Visor panel 52 of the second visor 50 can be made larger, smaller, or the same size as the visor panel 22 of the first sun visor 20.

Figure 5:
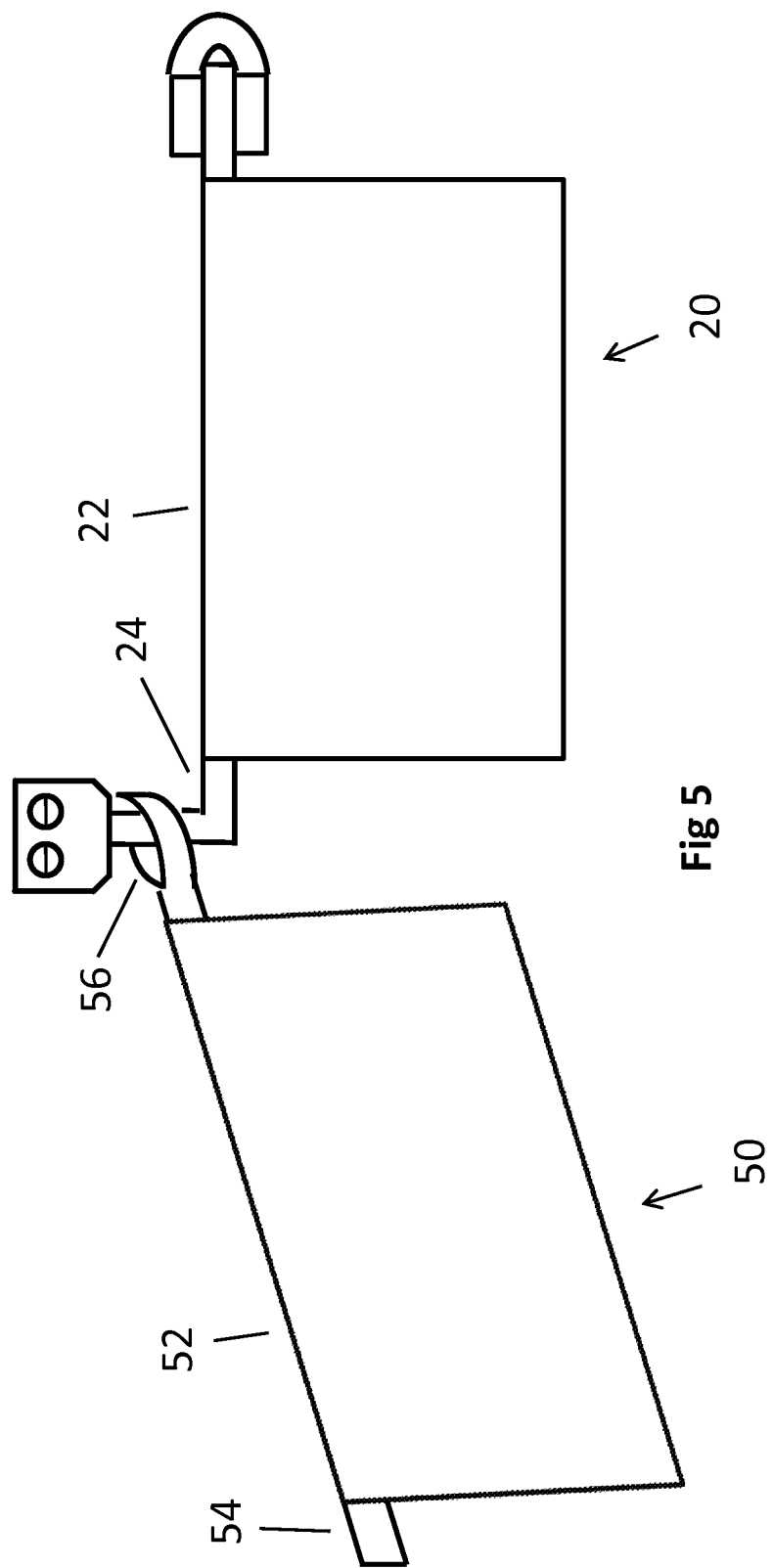
FIG. 5 shows the first sun visor in the blocked position to prevent glare from windshield and the second sun visor, pivoted to side window with the pivotal device, in the blocked position to prevent glare from side window.
Figure 6:
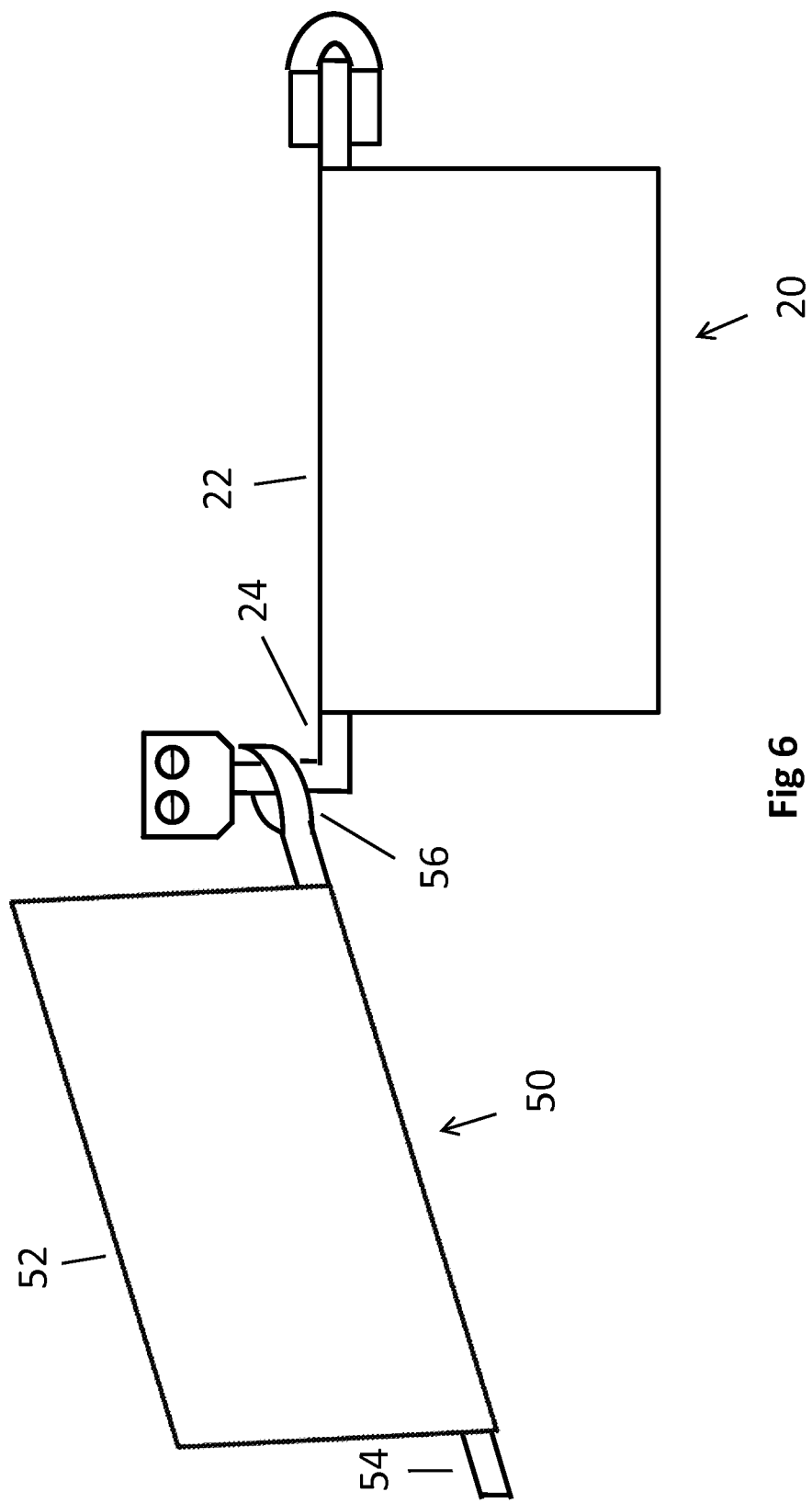
FIG. 6 shows the first sun visor in blocked position to prevent glare from the windshield and the second sun visor, pivoted to the side window with the pivotal device, in stored position above the side window by flipping the visor panel up.
Figure 7:
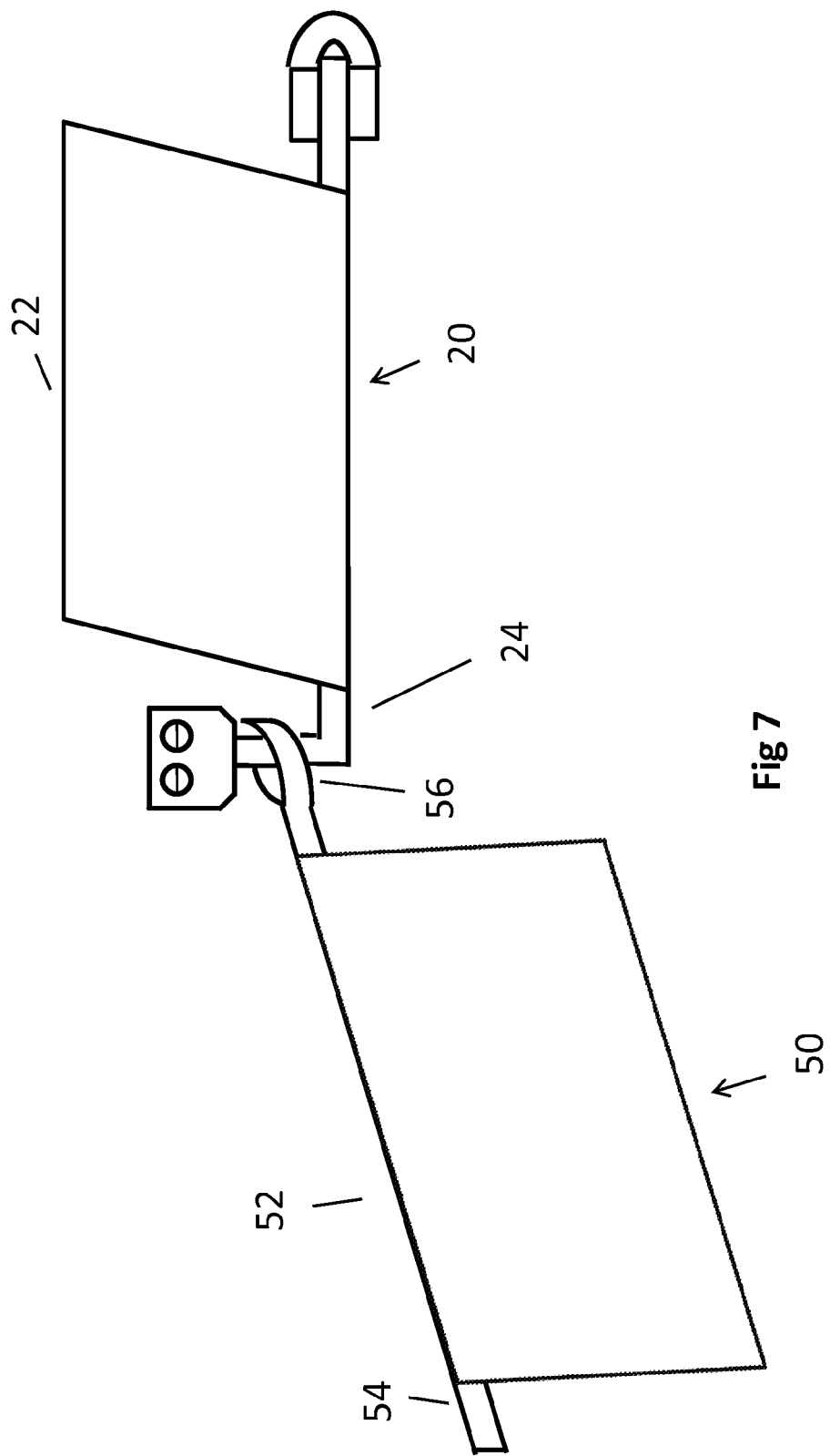
FIG. 7 shows the first visor in the stored position above the windshield by flipping the visor panel up and second visor, pivoted to the side window with the pivotal device, in the blocked position to prevent glare from the side window.
Figure 8:
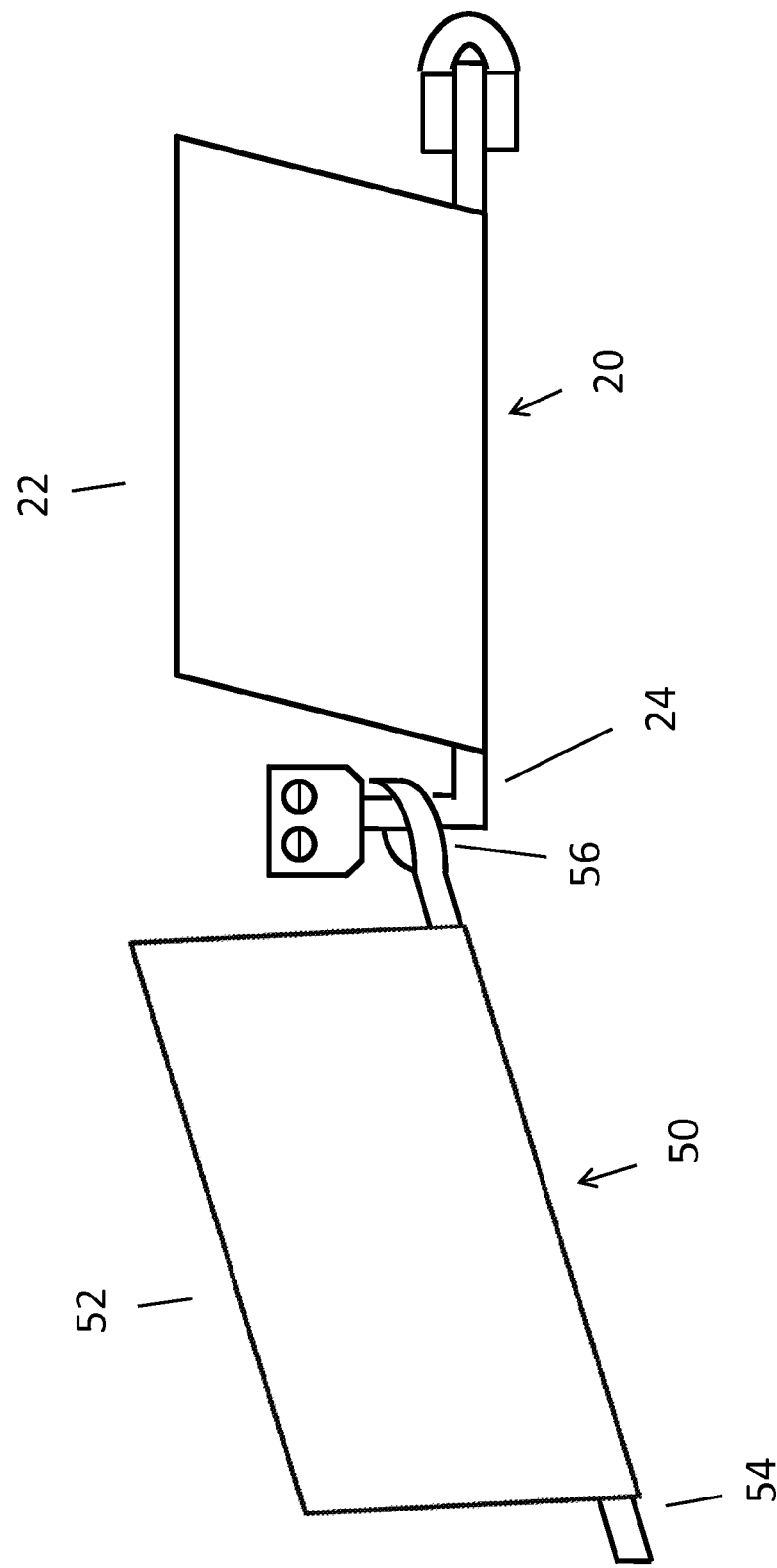
FIG. 8 shows the first visor in stored position above the windshield and the second visor, pivoted to the side window with the pivotal device, in the stored position above the side window.

FIG. 5 shows second visor 50 can be pivotally moved to the side window to block glare. The main sun visor 20 is also in the blocked position. Glare from both the windshield and side window are blocked in this configuration. Also both visors can easily switch between blocked position and store position as shown in FIG. 6, FIG. 7, and FIG. 8. This makes it safer and more convenient than the conventional single sun visor that needs frequently pivoted between windshield and side window and can't block glare from both windshield and side window at the same time.

FIG. 6 shows that the second visor 50 can be easily switched from the blocked position to the stored position on top of side window or vice versa (from stored position to blocked position) by simply flipping the visor panel 52. Switching between the positions can be done independently without interfering with the first sun visor 20. FIG. 7 shows that the first sun visor 20 can also be easily switched between the blocked position and stored position or vice versa. It also can be done separately from the second visor 50 without interfering. FIG. 8 shows both the first visor 20 and second visor 50 in stored positions above windshield and side window, respectively, which are stored differently from FIG. 2 in which both visors are stored above the windshield.

Figure 9:
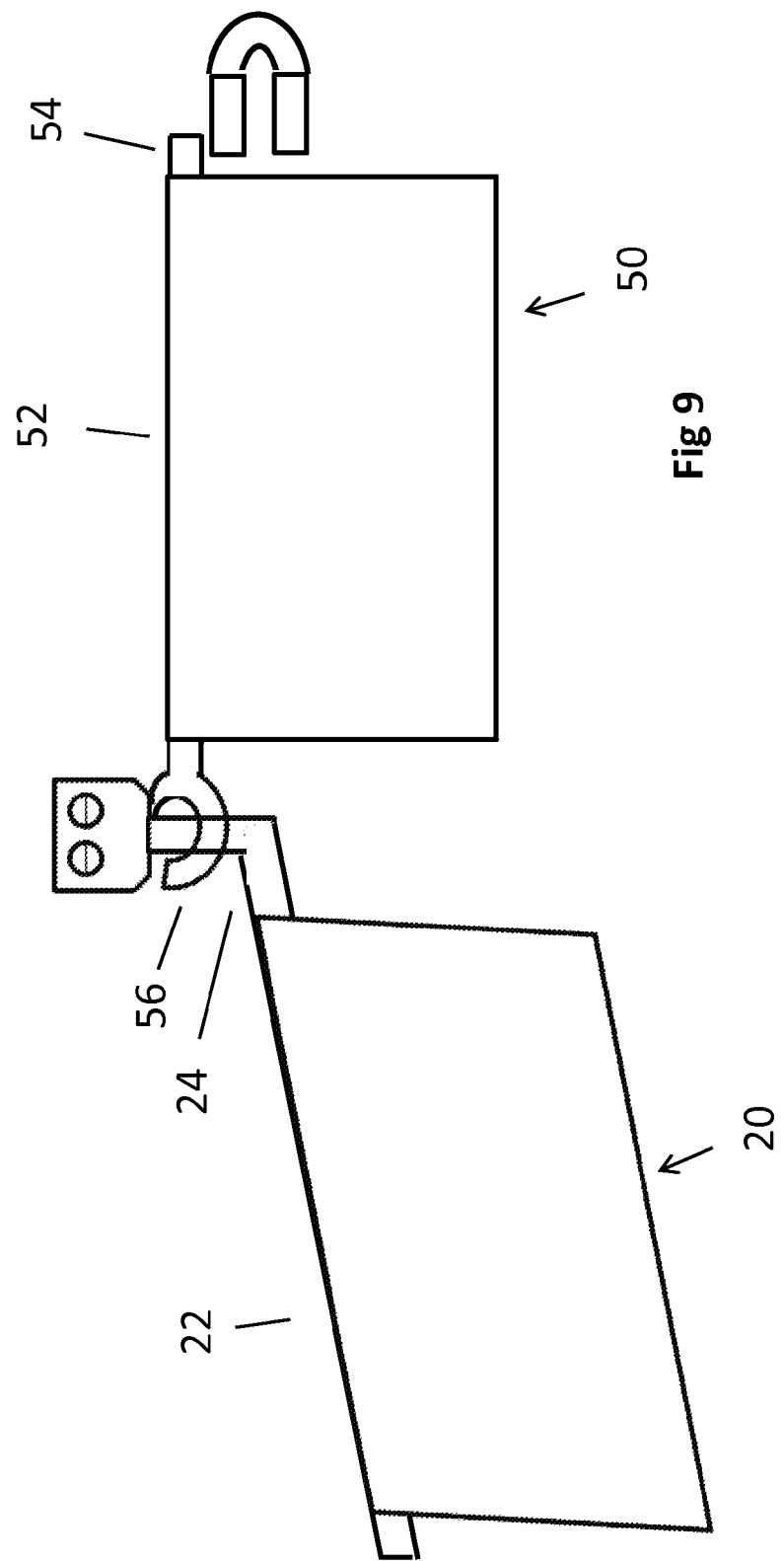
FIG. 9 shows the first visor and the second sun visor switching their positionsby pivoting the first visor to the side window and pivoting the second visor to the windshield.

FIG. 9 shows another advantage of the second visor 50 with pivotal device 56 attached to first visor support rod 24. The positions of the first visor 20 and second visor 50 can be interchanged between the windshield and side window. First visor 20 is used for side window, and second visor 50 is used for windshield.

Figure 10:
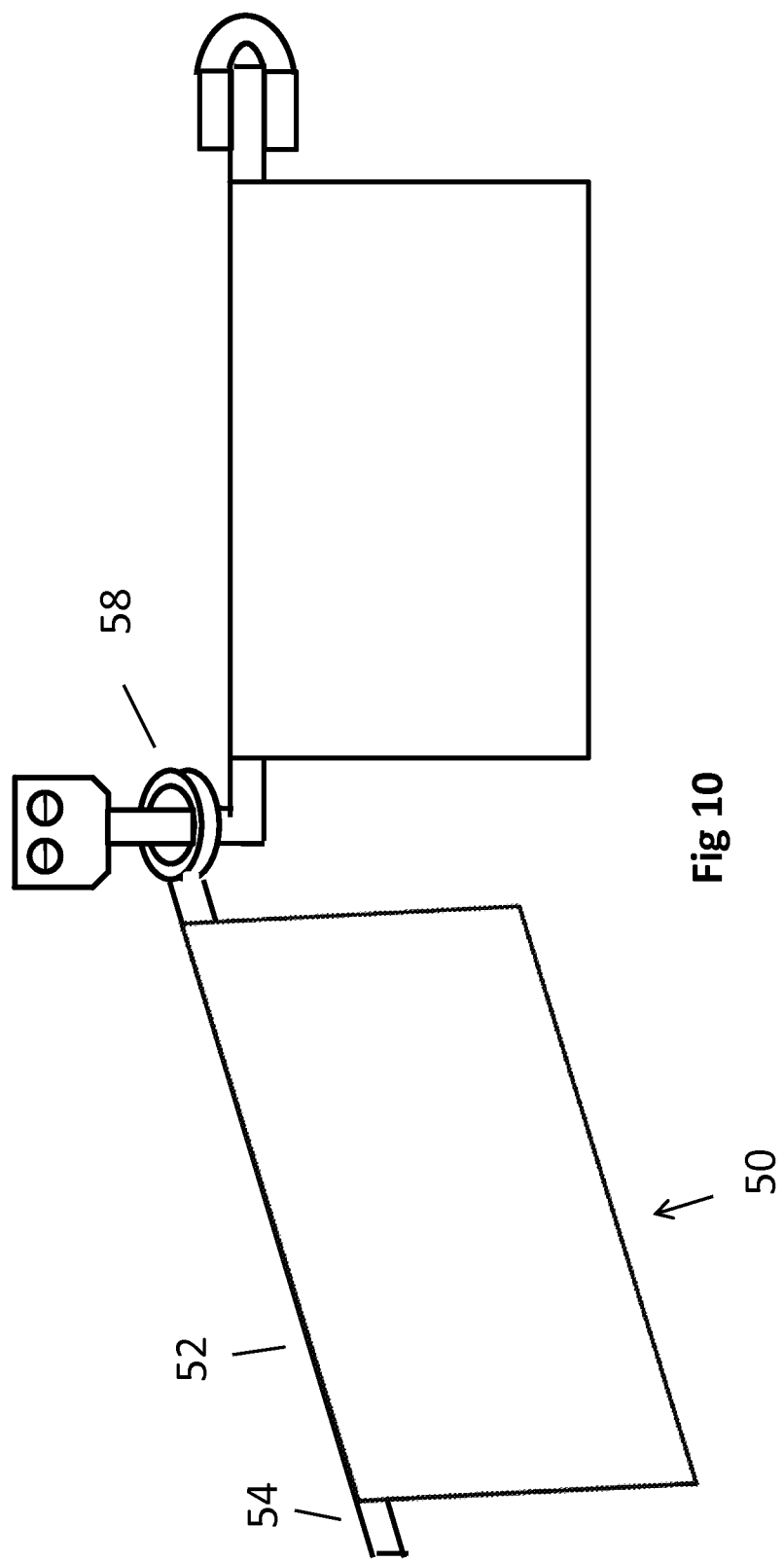
FIG. 10 shows the second visor pivotal device can also be a circular device or similar device with either open end or close end to provide pivotal movements.
Figure 11:
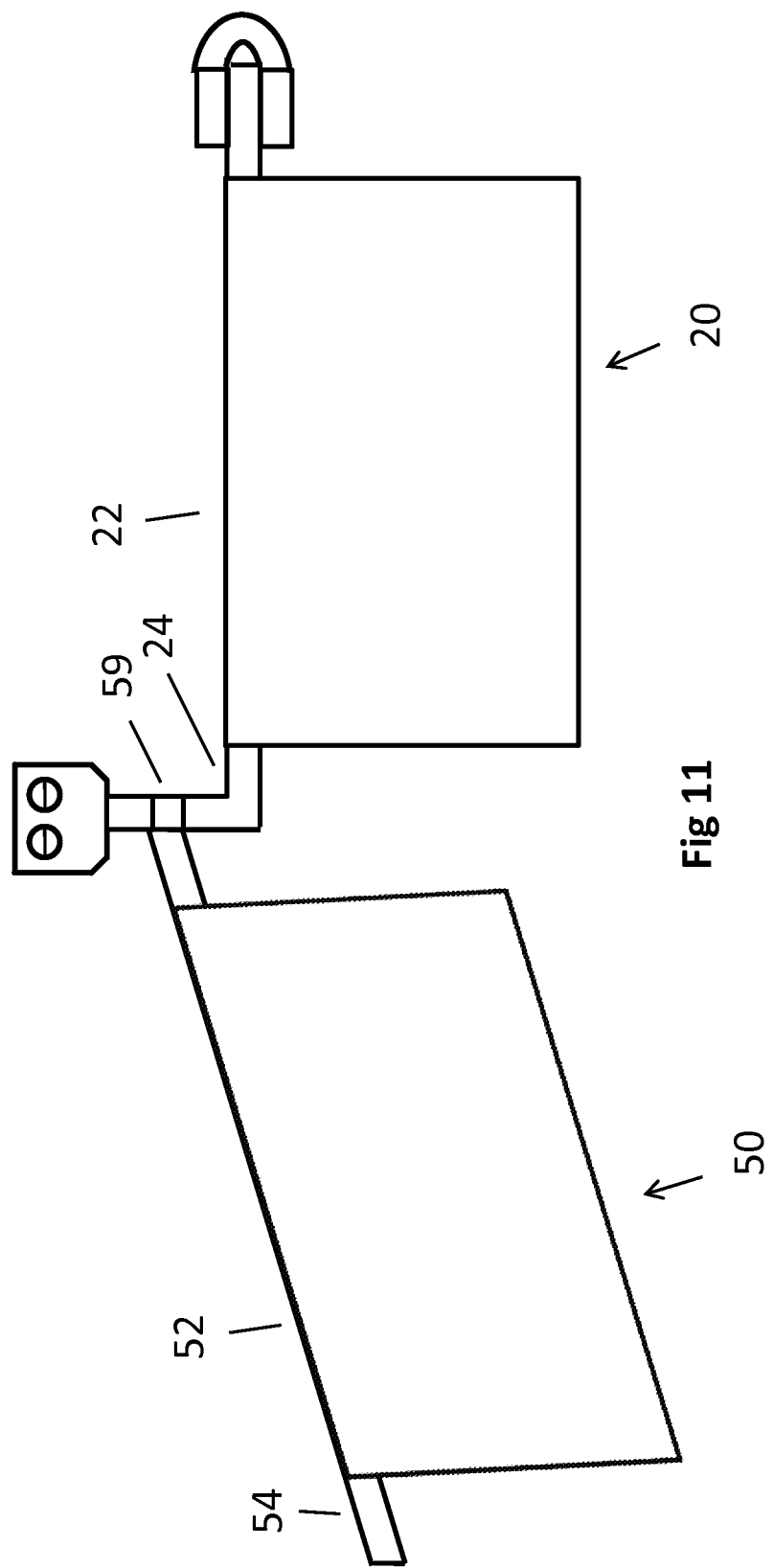
FIG. 11 shows the second visor pivotal device can also be a hinge device or similar device to provide pivotal movements.

FIG. 10 shows the pivotal support rod device of the second visor can be non-open end (enclosed) circular device 58 or similar device. Open end circular device, semi-cylindrical device, or similar pivotal device can also be used to provide pivotal movements. For open end or semi-cylindrical devices, it can be snapped into the visor support rod. The open end pivotal device can also be closed with a screw or a similar device. To install the non-open end circular device 58, remove the first sun visor from the bracket, inserting second visor support rod circular device 58 to first visor support rod 24 and then placing back the first sun visor support rod 24 to the bracket 40. FIG. 11 shows the second visor 50 with hinge device 59 on one end of support rod 52 connecting to first visor 20. It can be installed or uninstalled together with first visor to bracket 40. The hinge device 59 can provide pivotal movements for second visor 50 to move between the windshield and side window.

FIG. 1 to FIG. 11 show the visor system of the first visor and second sun visor with pivotal device for the driver side. The same visor system can also be employed for the passenger side or both driver and passenger side.

Figure 12:
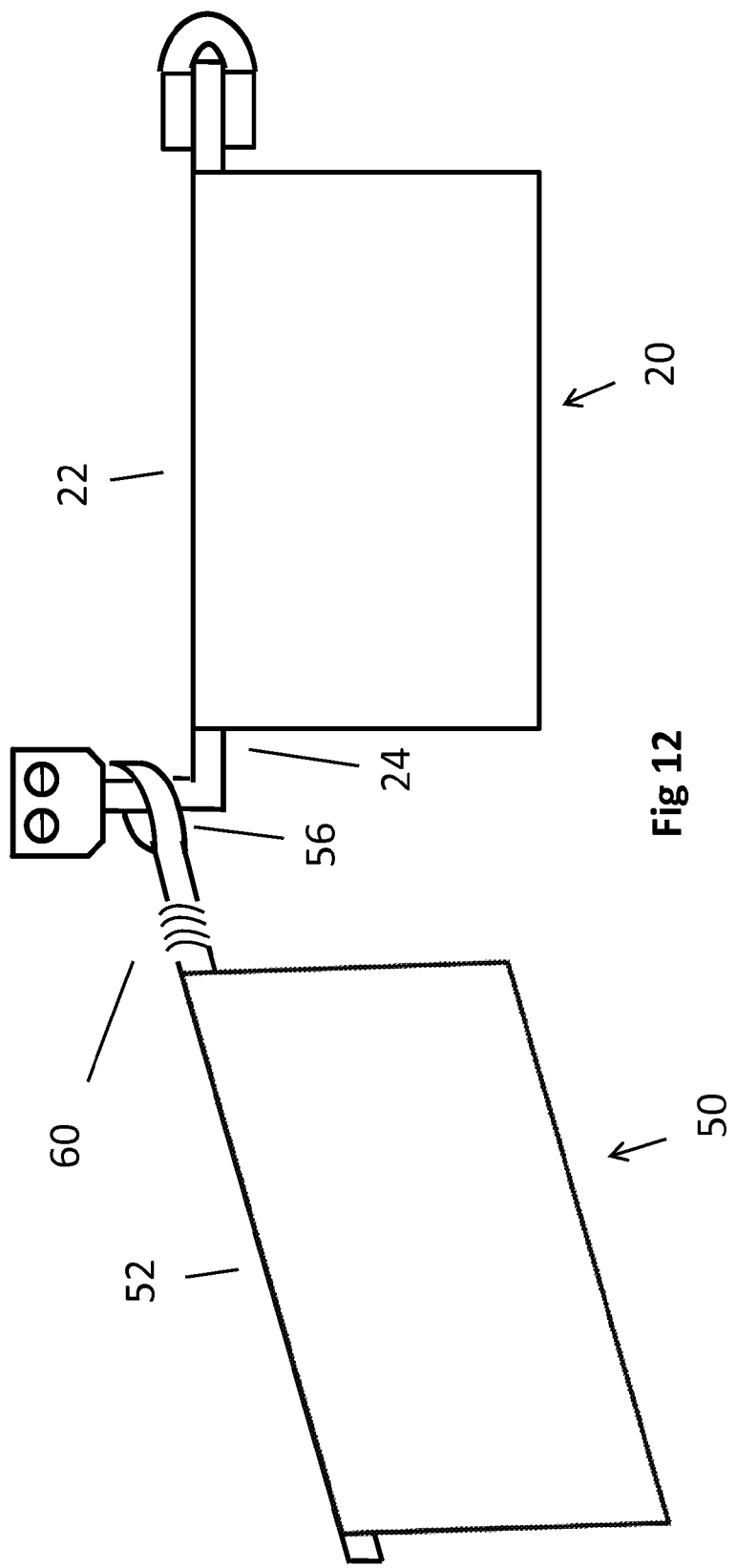
FIG. 12 shows the adjustable visor with part of the visor support rod made of flexible material.
Figure 13:
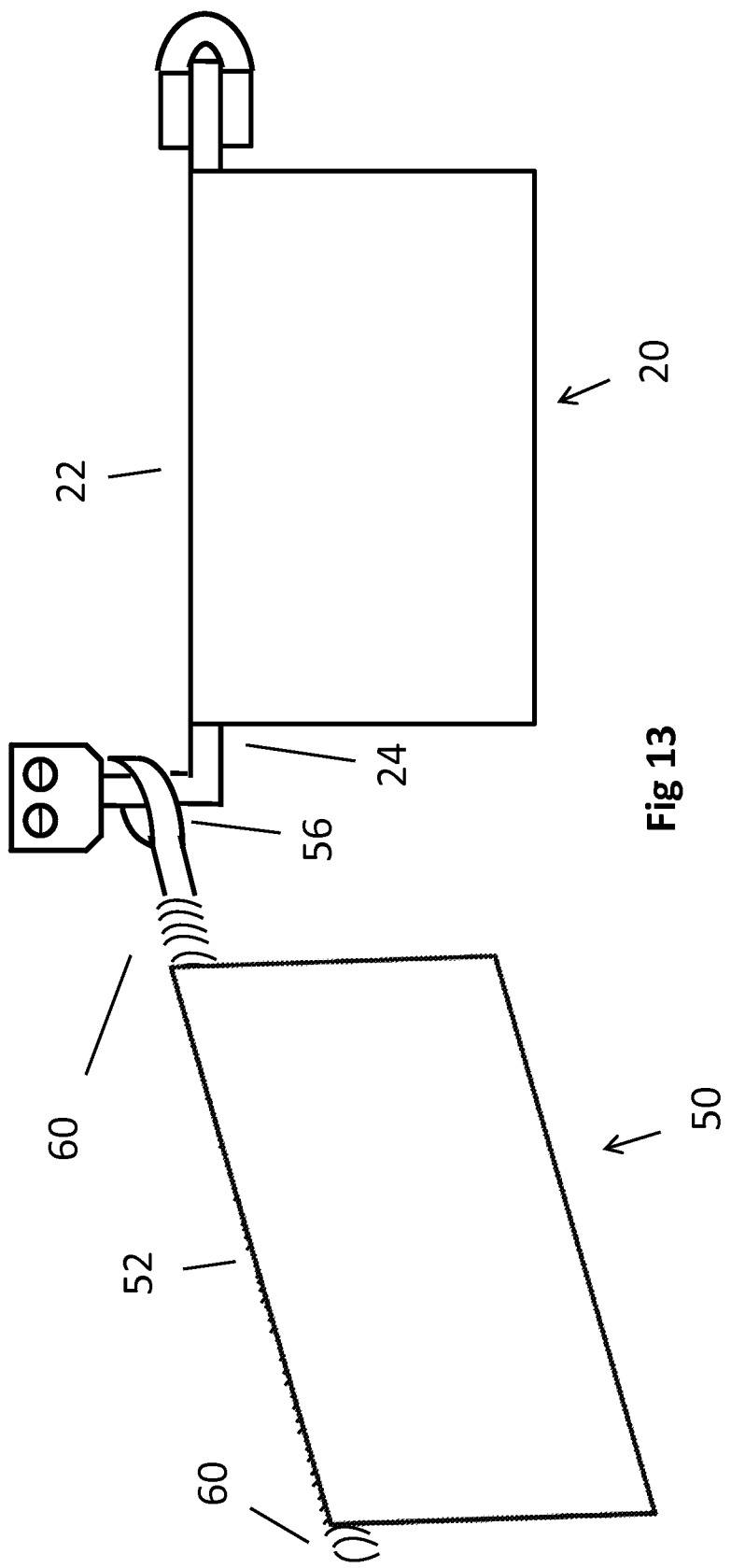
FIG. 13 shows the adjustable visor with the whole support rod made of flexible material.
Figure 14:
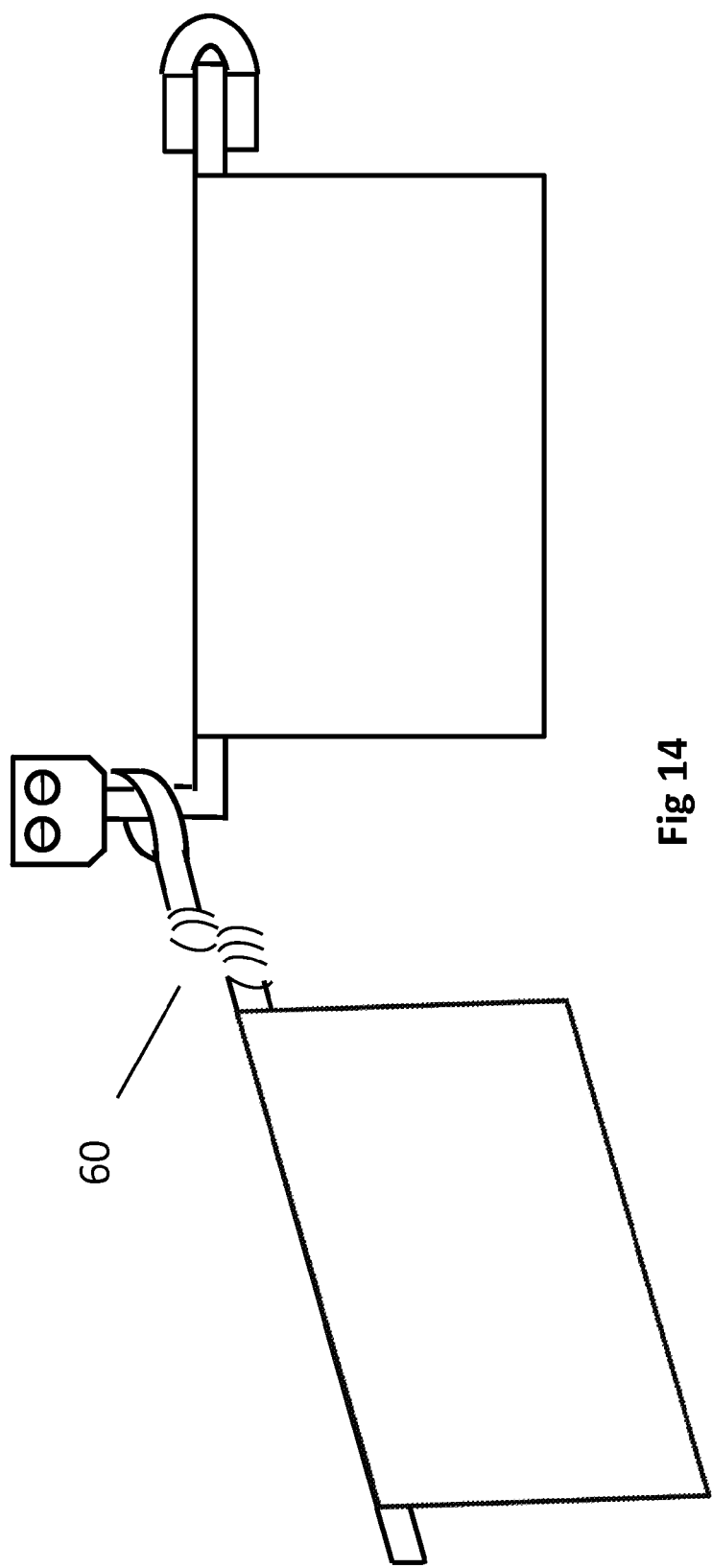
FIG. 14 shows the adjustable visor flexibly adjusted to the desired blocked positions to prevent glare from different angles.
Figure 15:
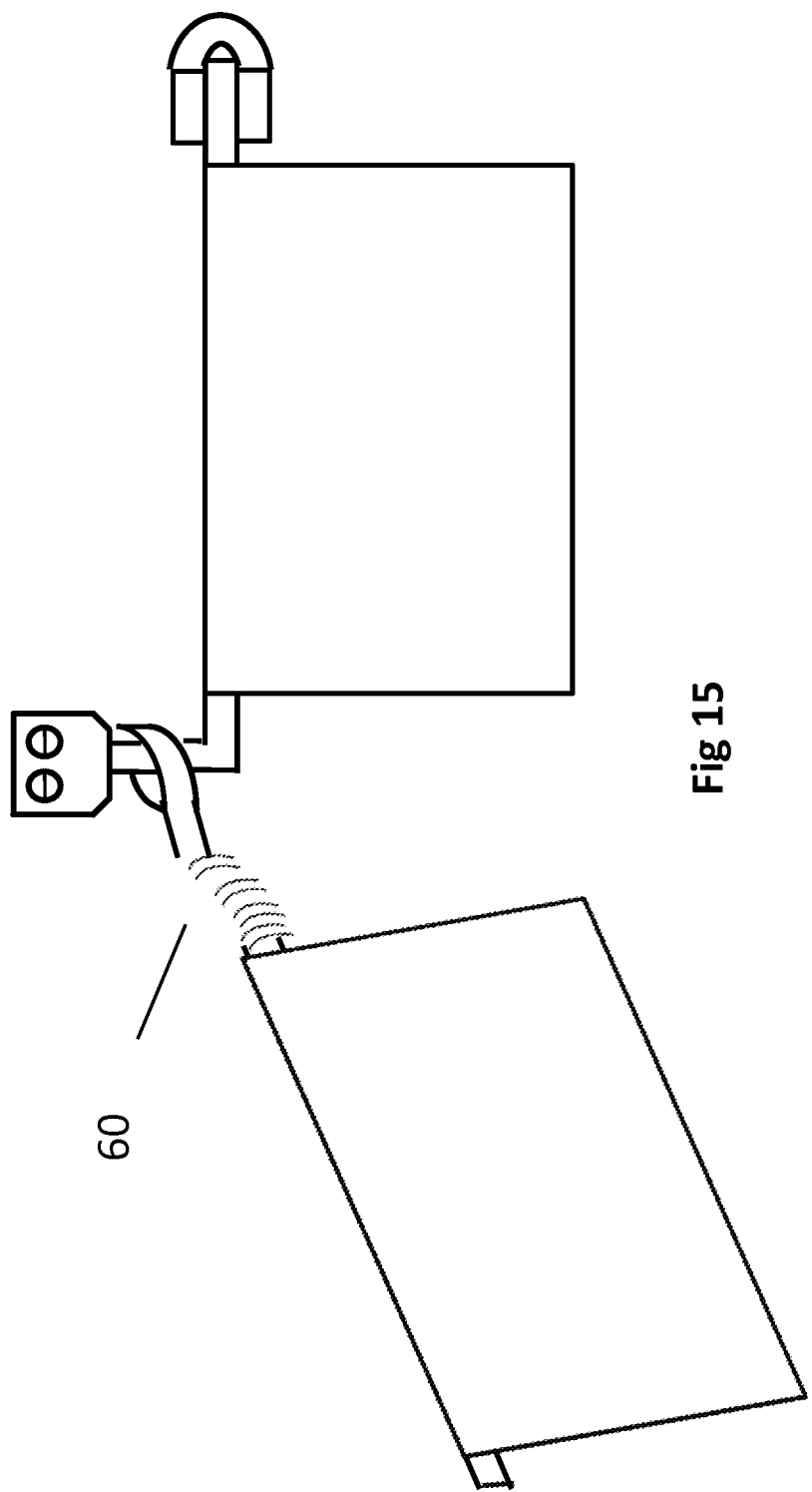
FIG. 15 shows another example of the adjustable visor flexibly adjusted to the desired blocked positions to prevent glare from different angles.
Figure 16:
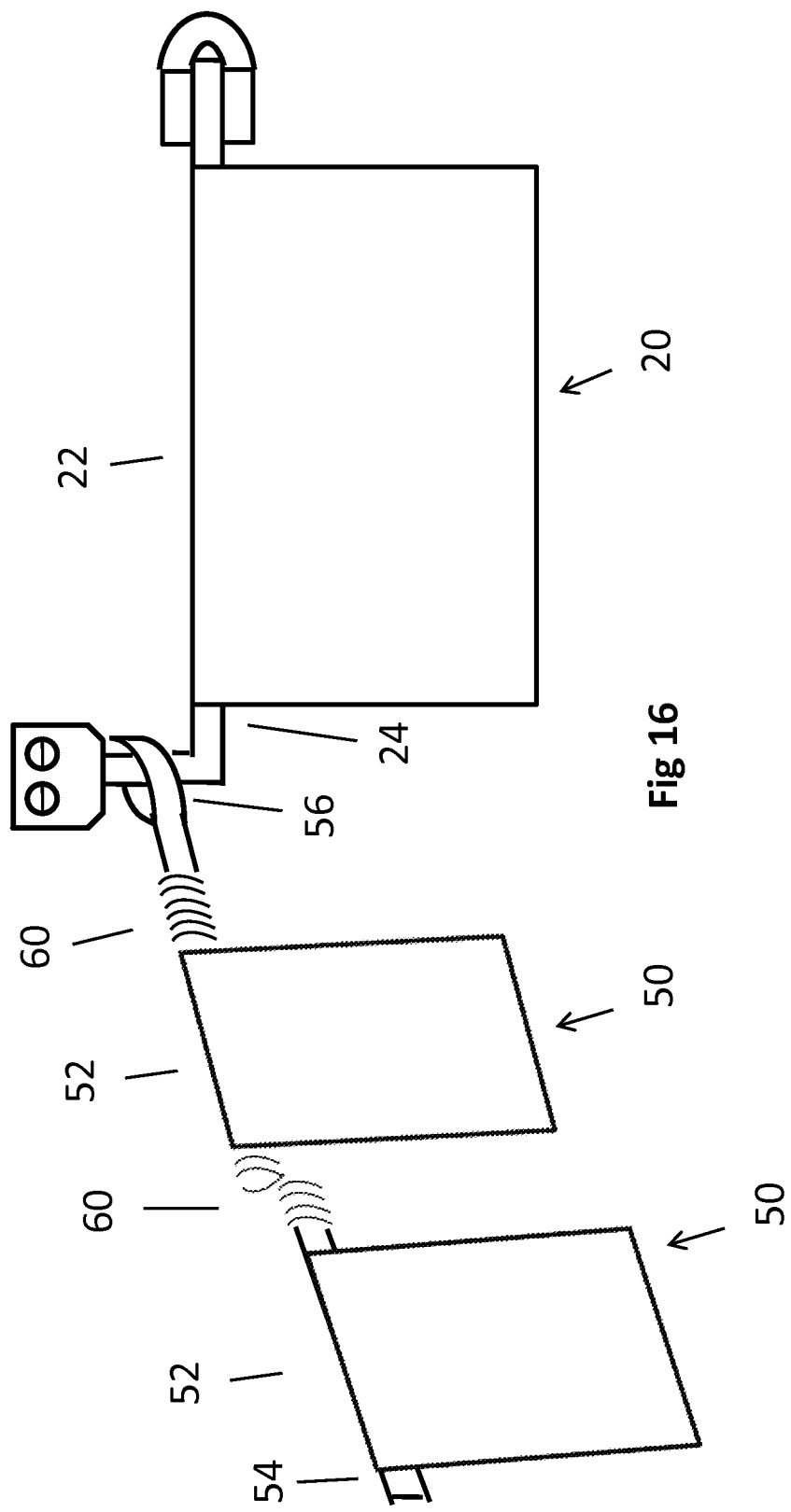
FIG. 16 shows that the two parts of the adjustable visor support rod made of flexible material can be flexibly adjusted to the two parts of visor to two blocked positions to block glare from different angles or positions of side window. Multiple parts or whole support rod can be made of flexible material.
Figure 17:
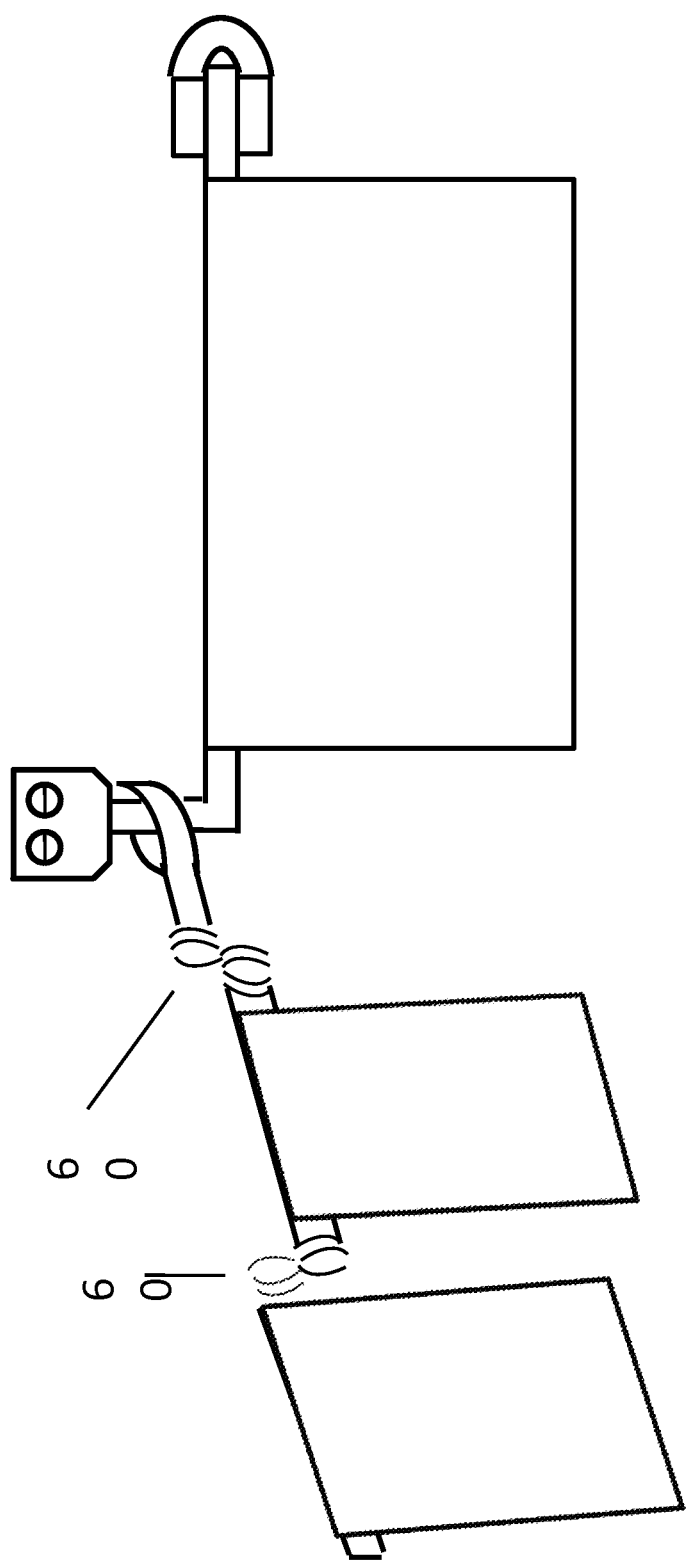
FIG. 17 shows another example of adjusting two parts of the support rod made of flexible material to two blocked positions to block glare from different angles.
Figure 18:
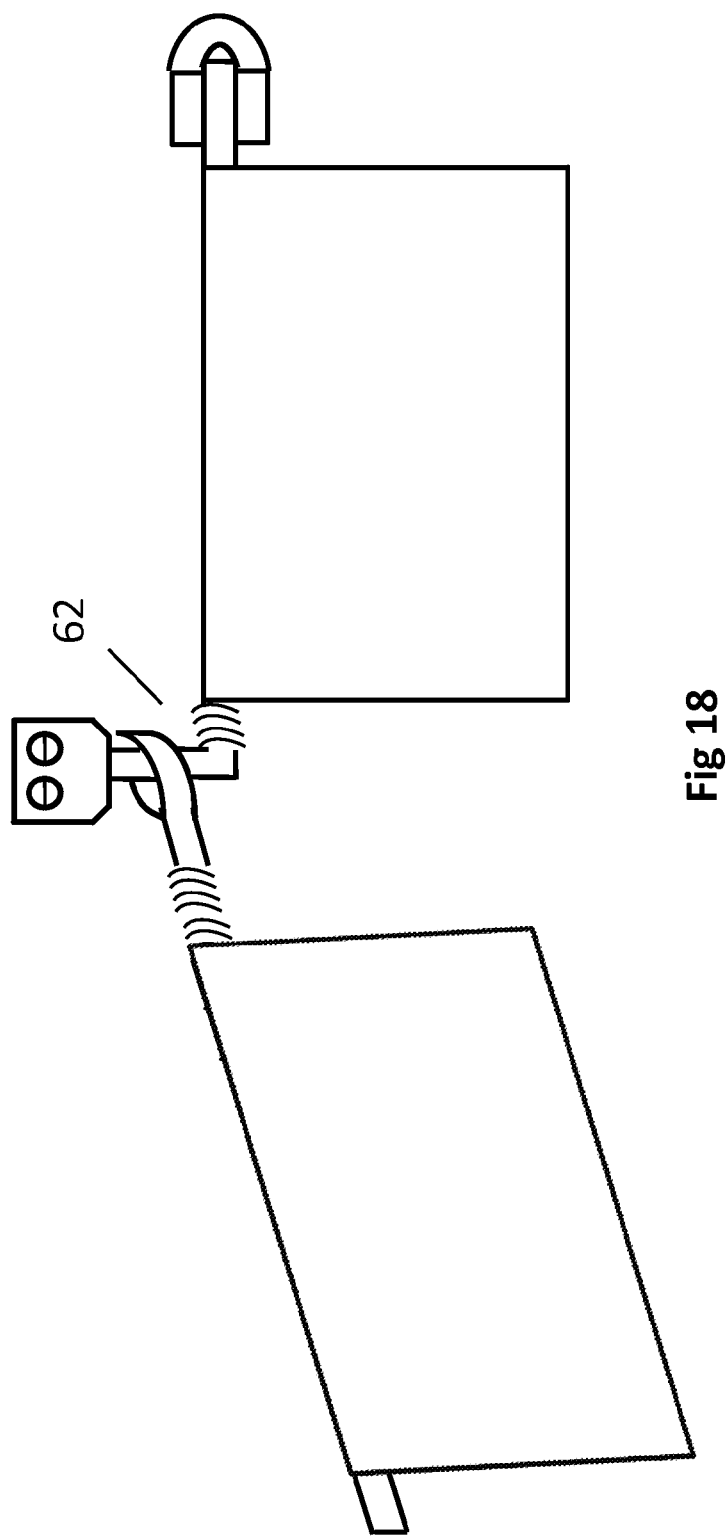
FIG. 18 shows adjustable visors with part of the support rod made of flexible material for first and second visor with the second visor attached to the first visor with pivotal device.
Figure 19:
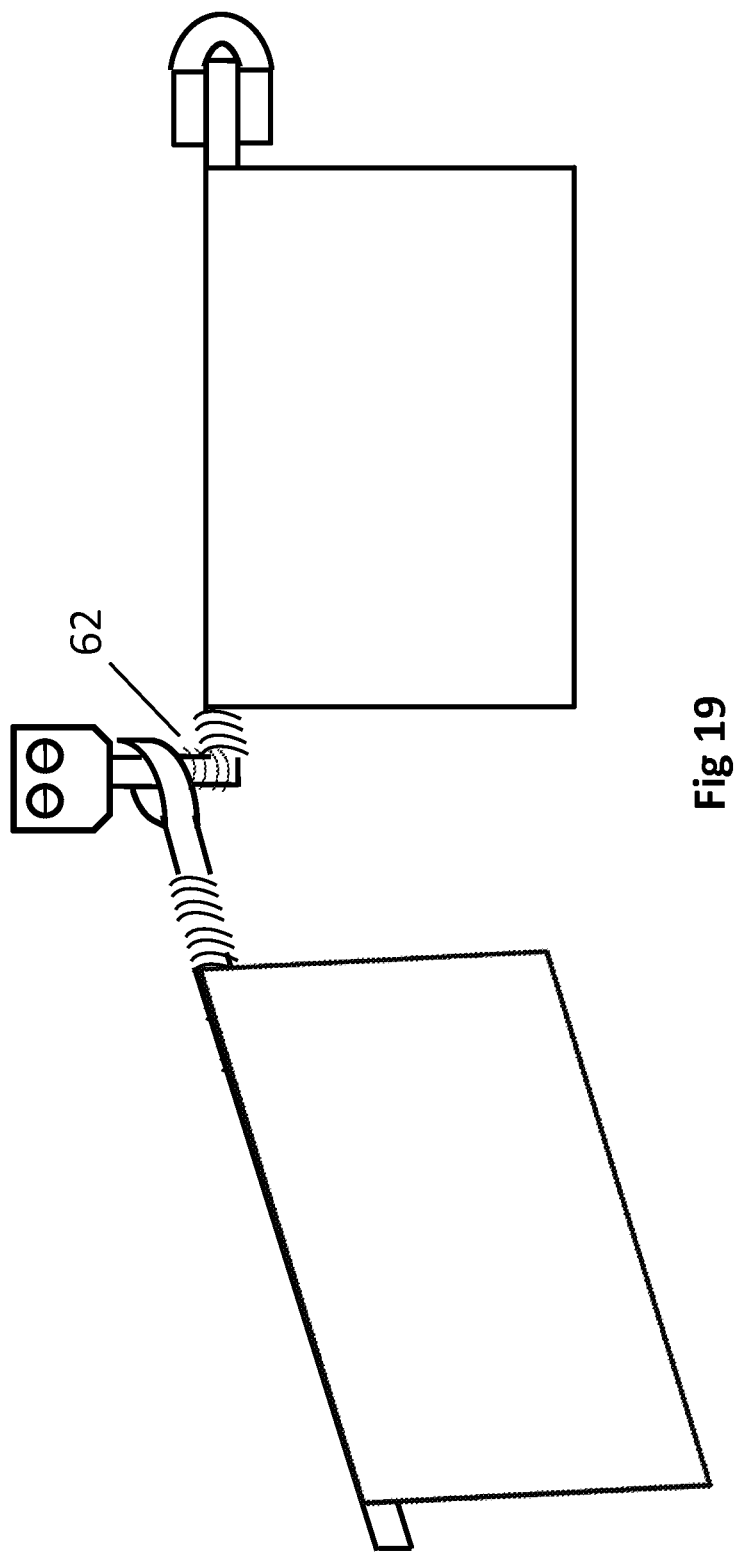
FIG. 19 shows another example of adjustable visors with the corner part of first visor support rod made of flexible material and part of second visor support rod made of flexible material.
Figure 20:
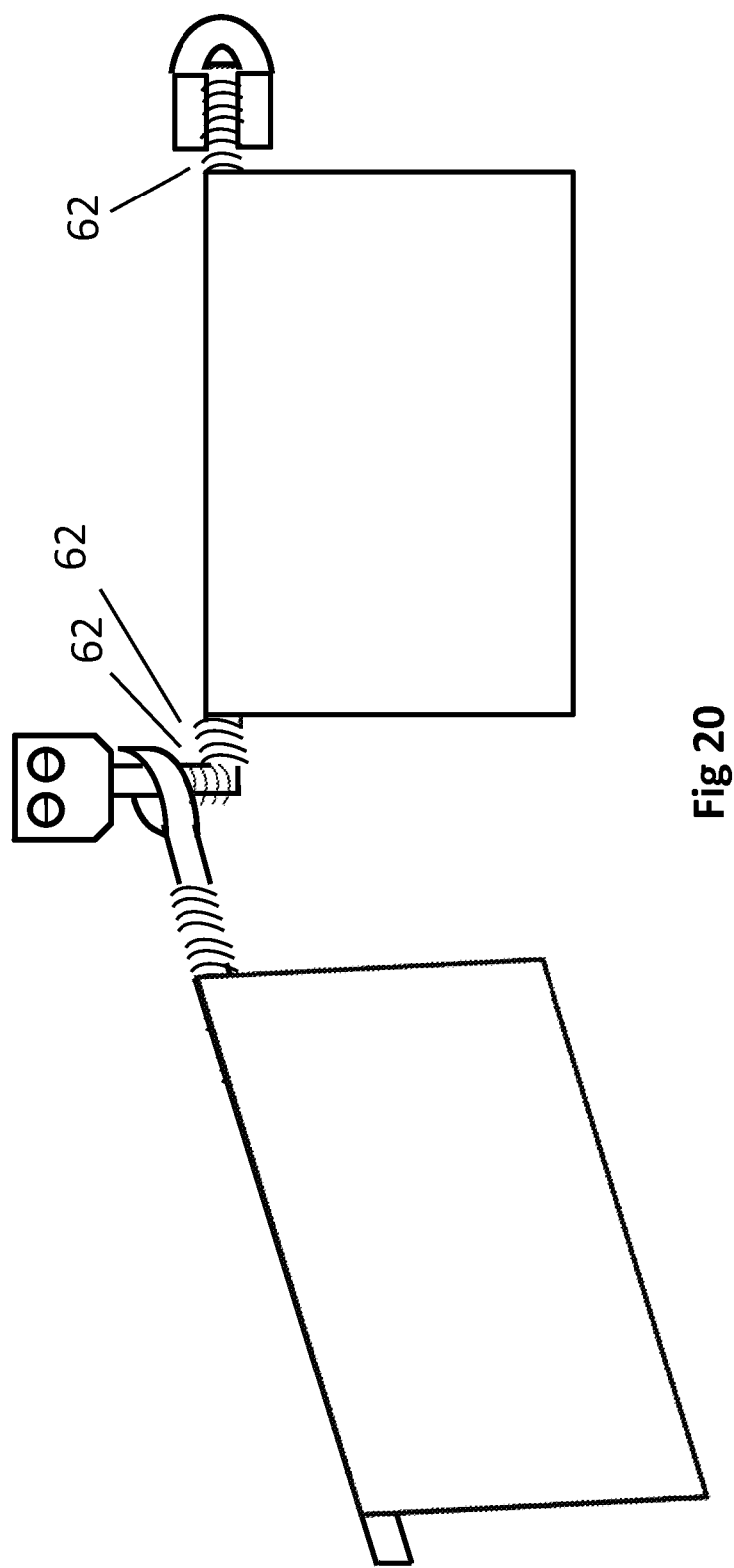
FIG. 20 shows the adjustable visor with whole support rod made of flexible material for first visor.
Figure 21:
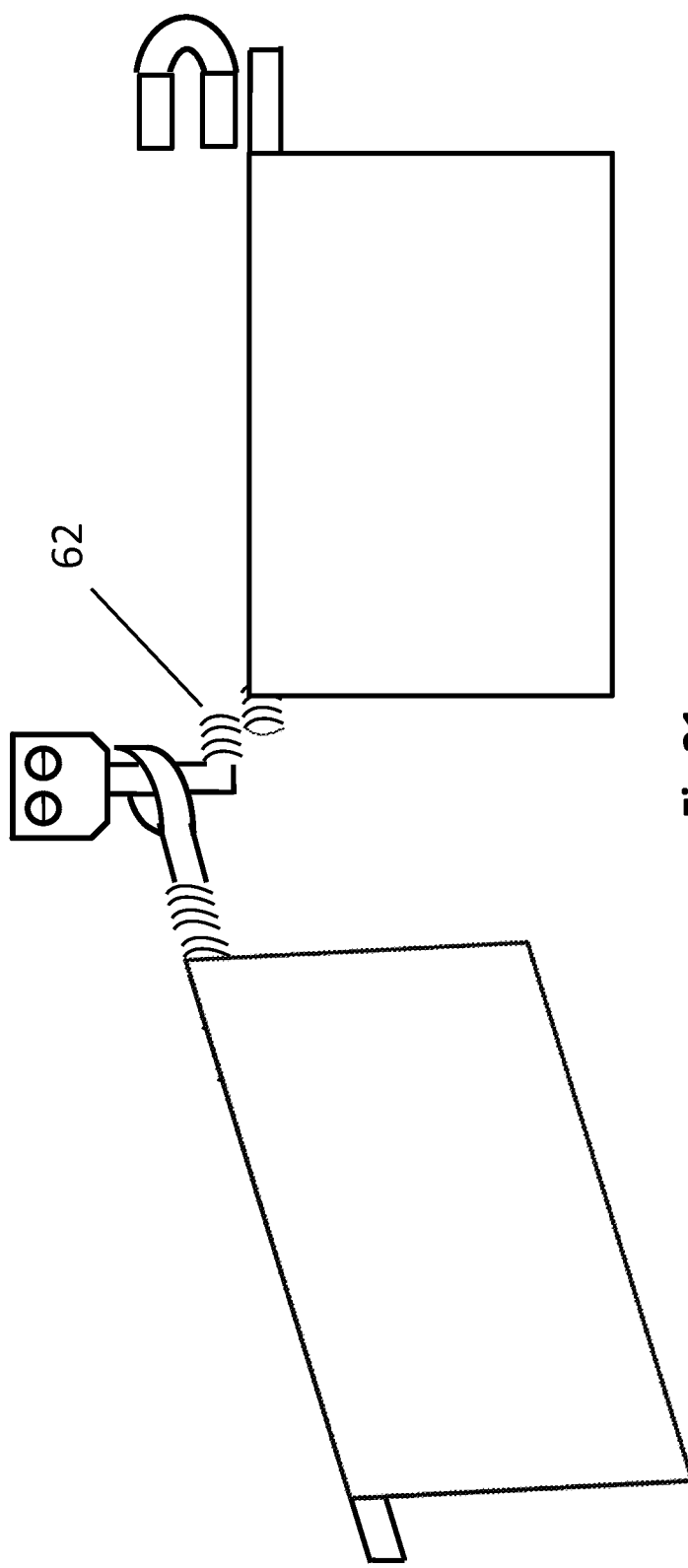
FIG. 21 shows the adjustable visor flexibly adjusted to desired blocked positions to block glare from different positions.
Figure 22:
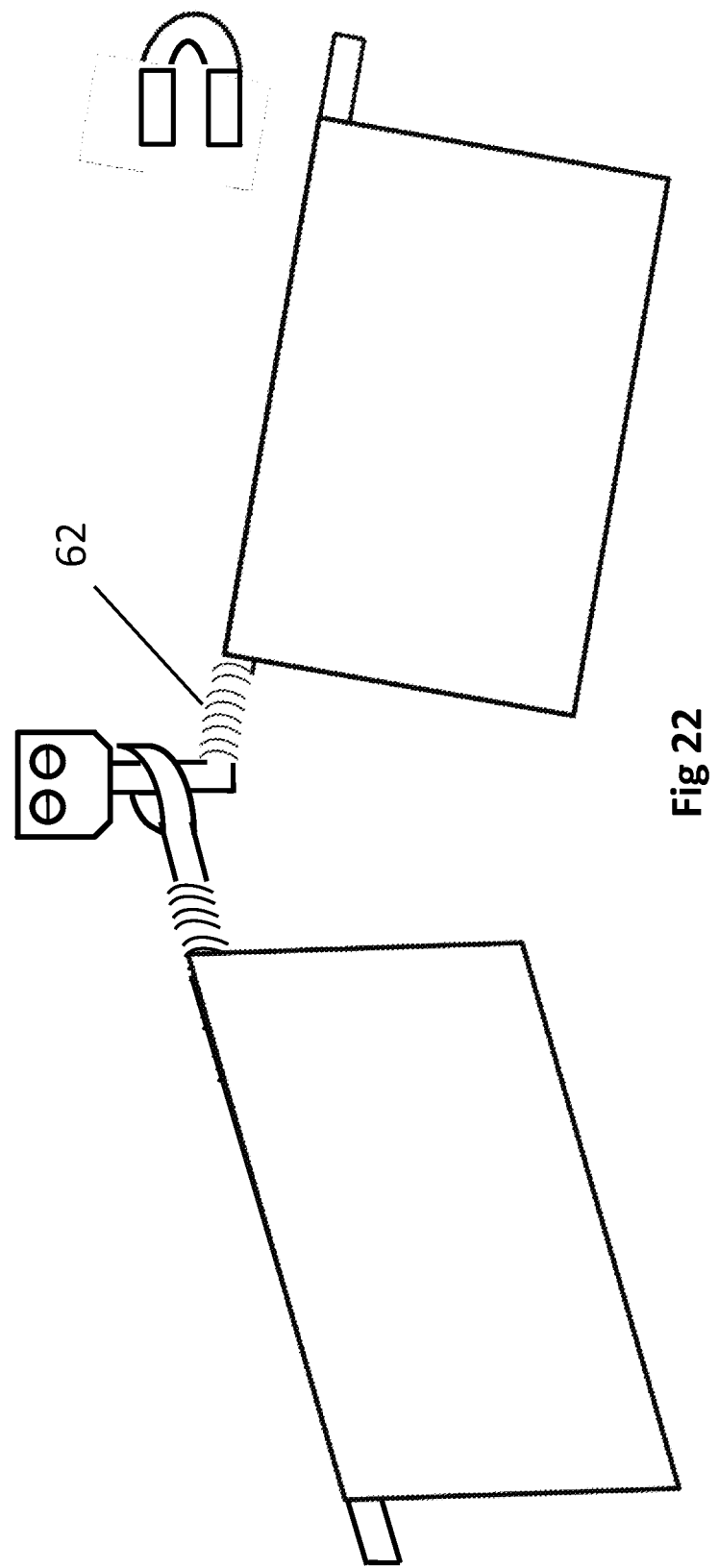
FIG. 22 shows another example of the adjustable visor flexibly adjusted to the desired blocked positions to block glare from different angles or positions.

FIGS. 12 and 13 show that the second visor's support rods, made of flexible material such as gooseneck arm, can be easily bent or adjusted to the desired blocked positions. The support rod can be made partially, like FIG. 12 or entirely, like FIG. 13 with the flexible material. FIG. 14 and FIG. 15 are examples of bending or adjusting to the desired blocked positions. This adjustable visor provides the advantage of flexible and diverse movements to the desired blocked positions to block glare more easily, efficiently, and widely.

Figure 32:
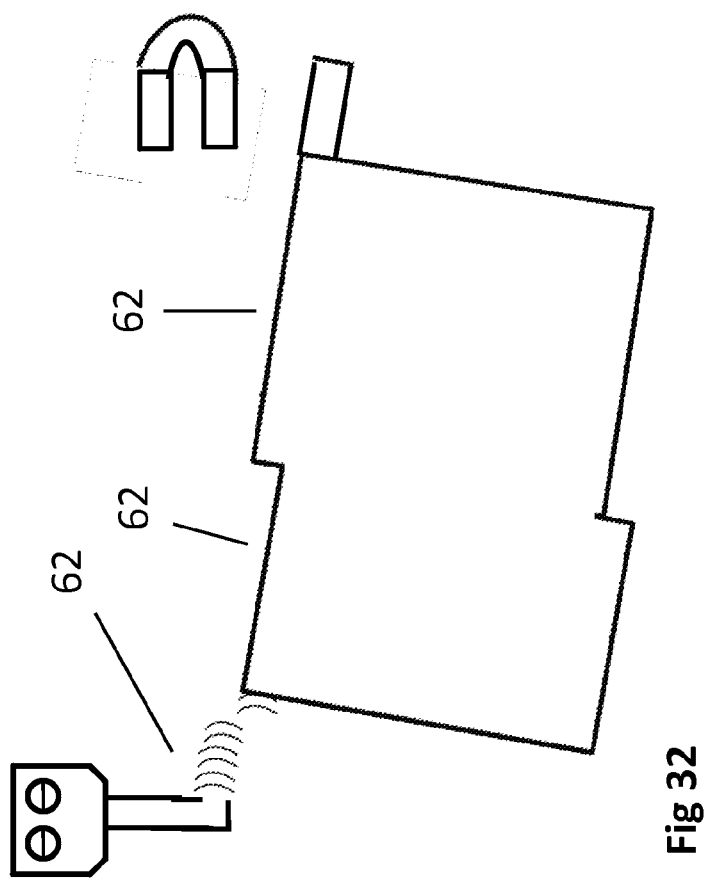
FIG. 32 shows another example of the adjustable visor with both the support rod and visor panel made of flexible material and it shows adjustments of two parts of the visor to two desired blocked positions to block glare from different positions. Multiple parts of the support rod or the whole support rod and visor panel can be made of flexible material and this can be applied to the multiple visor system as well.

FIG. 14, FIG. 15, FIG. 16, and FIG. 17 show that support rod can be partially made of flexible material for one section or multiple sections to bend or adjust to the multiple desired blocked positions. Multiple sections provide more flexibility of blocking glare from multiple locations. Visor panel can also be made of flexible material for one section or multiple sections to be able to bend together with support rod made of flexible material as shown in FIG. 32.

Figure 23:
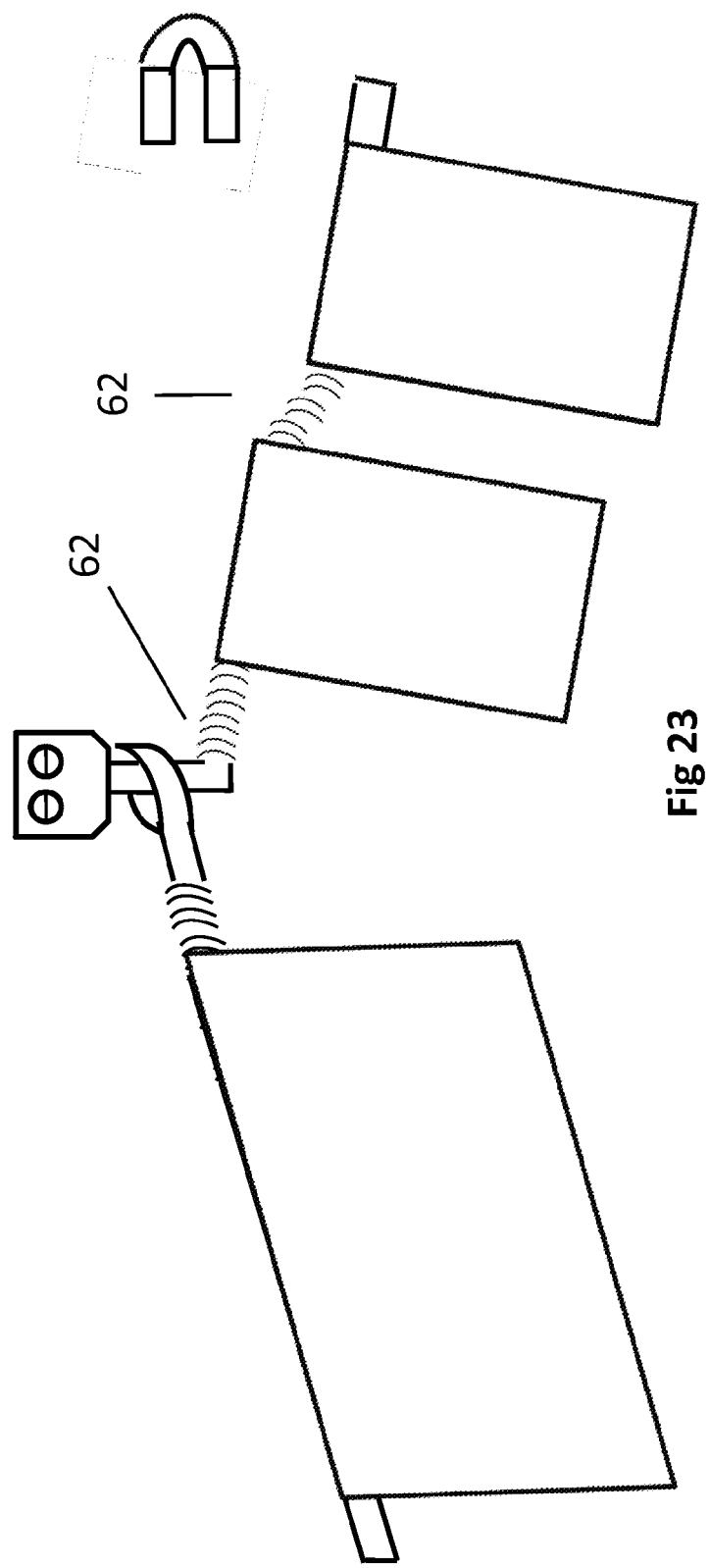
FIG. 23 shows that the two parts of the adjustable visor support rod made of flexible material, can flexibly adjust two parts of visor to two blocked positions to prevent glare from positions. Multiple parts or whole support rod can be made of flexible material.
Figure 24:
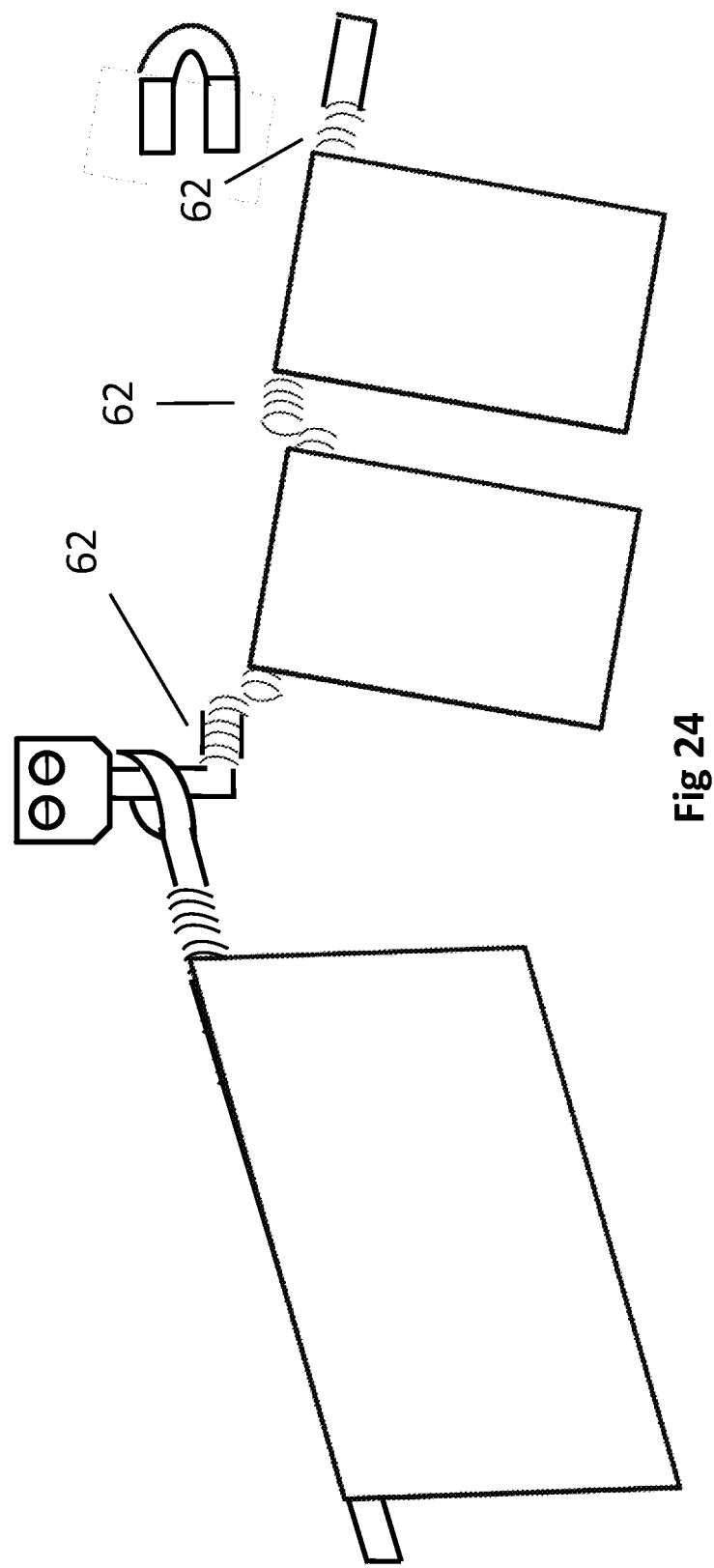
FIG. 24 shows another example of adjusting two parts of support rod made of flexible material to two blocked positions to block glare from different angles.
Figure 25:
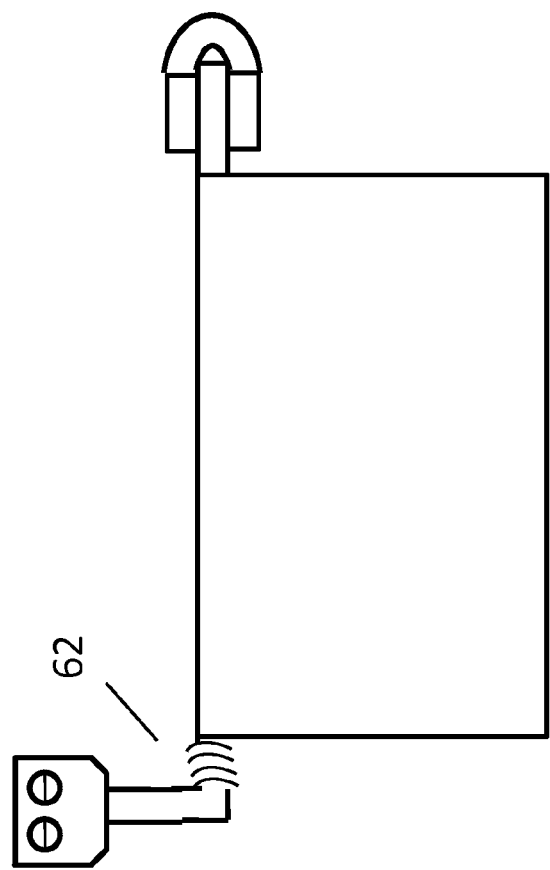
FIG. 25 shows the adjustable visor with part of the visor support rod made of flexible material for the single visor system.
Figure 26:
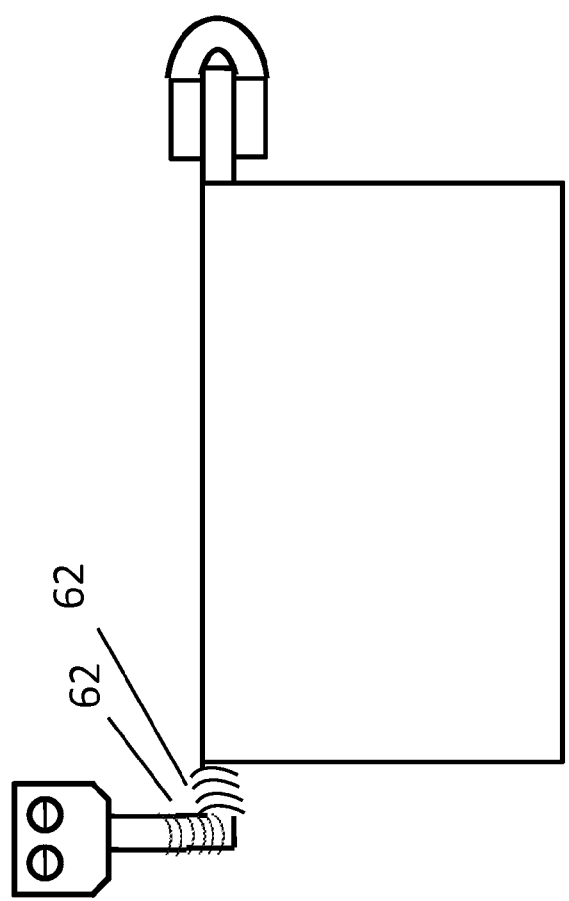
FIG. 26 shows another example of the adjustable visor with corner part of support rod made of flexible material for the single visor system.
Figure 27:
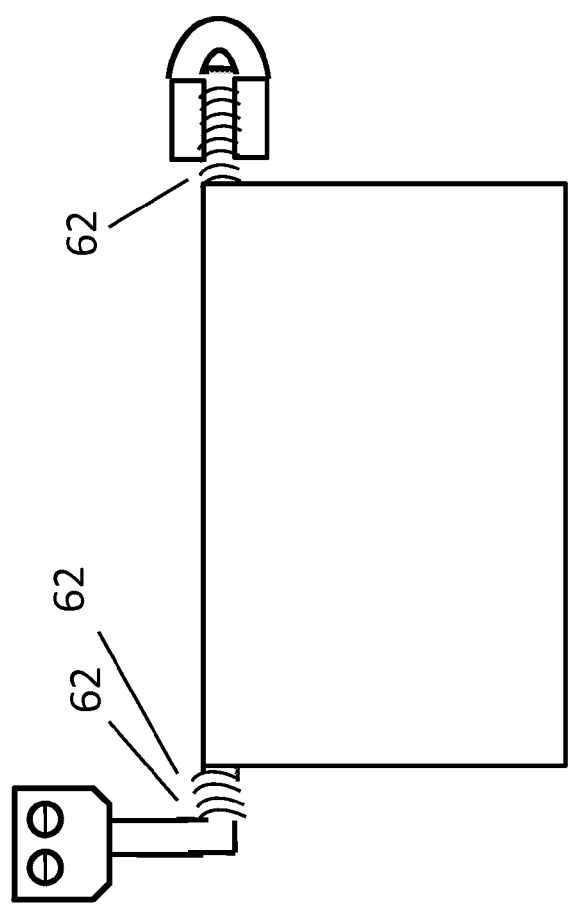
FIG. 27 shows the adjustable visor with the whole support rod made of flexible material for the single visor system.
Figure 28:
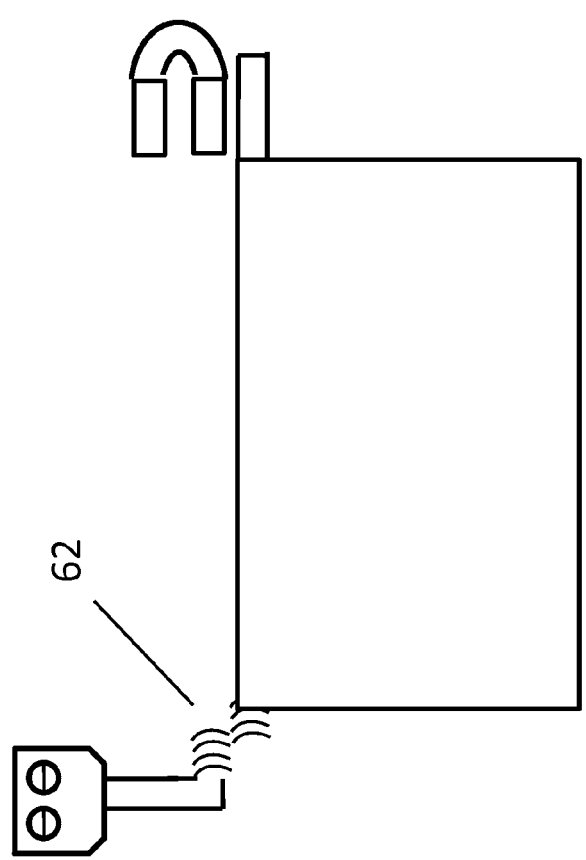
FIG. 28 shows the adjustable visor flexibly adjusted to the desired blocked positions to block glare from different angles.
Figure 29:
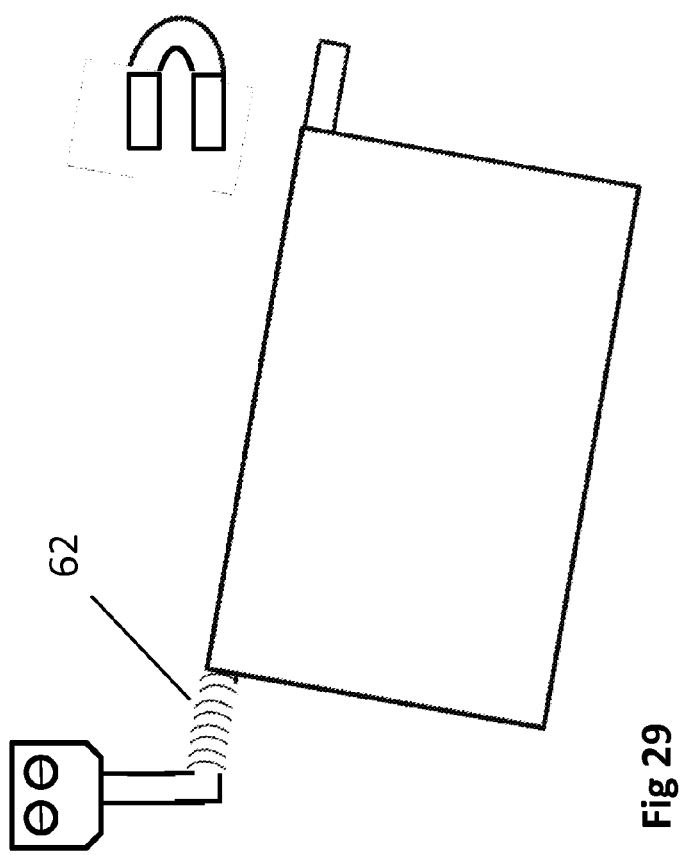
FIG. 29 shows another example of the adjustable visor flexibly adjusted to the desired blocked positions to block glare from different angles.
Figure 30:
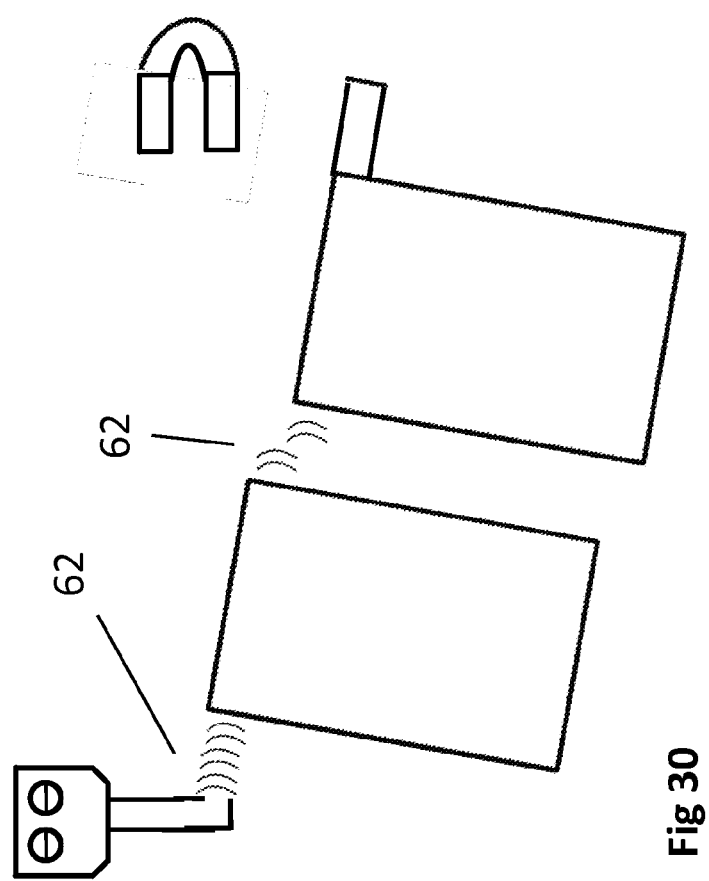
FIG. 30 shows that two parts of the adjustable visor support rod made of flexible material for single visor system, flexibly adjust two parts of visor to two desired blocked positions to block glare from different angles or positions of windshield.
Figure 31:
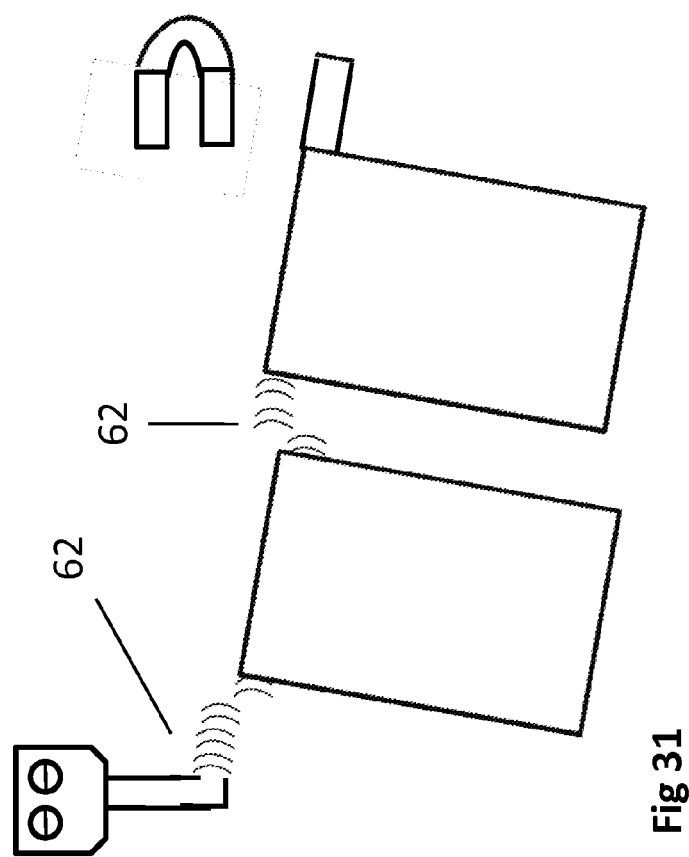
FIG. 31 shows another example of adjusting two parts of the support rod made of flexible material to two blocked positions to block glare from different angles and also multiple parts of the support rod or the whole support rod can be made of flexible material.

The adjustable sun visor with the support rod made of flexible material, partially or entirely, can be applied to the first sun visor, second visor, or both the visors to provide easy and pliable bending to the desired positions. FIG. 18 to FIG. 24 show the adjustable sun visor system apply to both first and second sun visors with support rods made of flexible material partially or wholly, to provide flexible movement of visors to the desired positions to block glare from different angles. FIG. 23 and FIG. 24 show examples of bending or adjusting of multiple sections of support rod made of flexible material.

Figure 33:
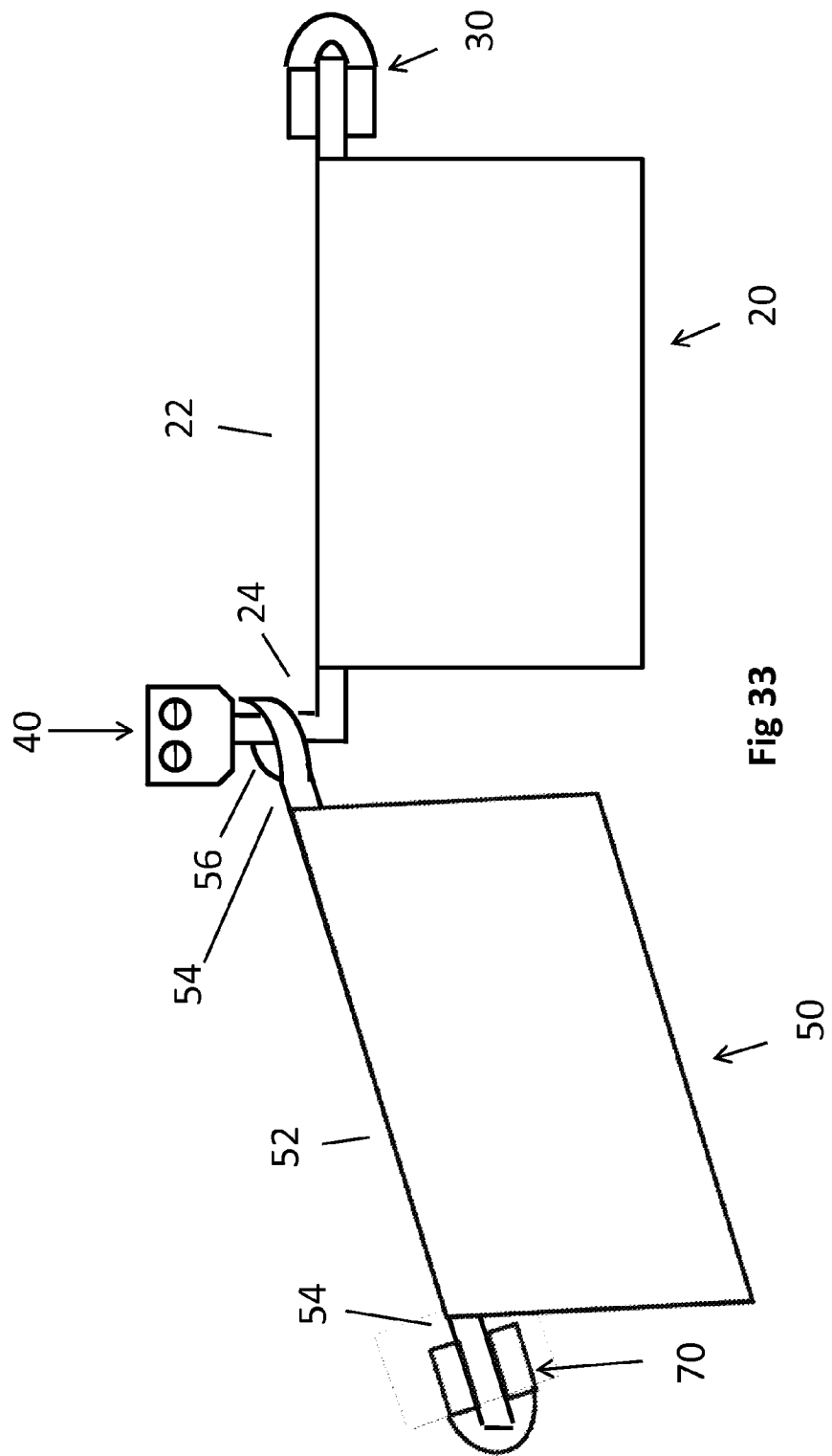
FIG. 33 is a perspective view of the first visor with one end of support rod attached to the bracket above windshield and one end of second visor's support rod attached to the bracket installed above the side window to maintain the position.

FIG. 25 to FIG. 31 show the adjustable sun visor system applied to a single visor system with support rod made of flexible partially or entirely. FIG. 33 shows bracket 70 installed above the side window so that the second visor support rod can snap into bracket 70 to maintain the position.

While particular embodiments of the invention have been shown and described, it will be understood by those skilled in the art that changes and modifications in the form and detail may be made therein without departing from the spirit and scope of the invention.

What is claimed is:
1. A visor system for a vehicle comprising:
  a. first visor having support rod
  b. second visor having support rod with pivotal device on one end of the support rod, said pivotal device connecting to said first visor support rod to provide pivotal movements

Whereby said second visor can be easily attached to said first visor, and said first visor and said second visor can be moved to block glare from the vehicle windshield and side window and can be easily stored above the windshield and side window.

2. A visor system of claim 1, wherein said first visor can be switched between stored position above the windshield and blocked position next to windshield to block glare, and said second visor can pivot to the side window with pivotal support rod and can be switched between the stored position above the side window and blocked position next to side window.

3. A visor system of claim 1, wherein said first visor can be pivoted to side window and can be switched between the stored position above side window and the blocked position next to side window, and said second visor can be switched between stored position above windshield and blocked position next to the windshield.

4. A visor system of claim 1, wherein said pivotal device includes pivotal socket device to provide pivotal movements between vehicle side window and windshield.

5. A visor system of claim 1, wherein said pivotal device includes a hinge device to provide pivotal movements between the vehicle side window and windshield.

6. A visor system of claim 1, wherein said pivotal device includes a circular device to provide pivotal movements between vehicle side window and vehicle windshield and said circular device including open end device and non open end device.

7. A visor system of claim 1, wherein a support socket can be installed above the side window so that said second visor can be attached into said support socket to keep said second visor in position.

8. A visor system for a vehicle comprising:
  a. first visor having support rod and visor panel to switch between stored position above windshield and blocked position next to windshield by flipping said visor panel to block glare from windshield
  b. second visor having visor panel and support rod with pivotal device on one end of the support rod, said pivotal device connecting to said first visor support rod to provide pivotal movement to side window, and flipping said visor panel of second visor to switch between stored position above side window and blocked position next to side window to block glare from side window Whereby said second visor can be easily attached to first visor, and said first visor and said second visor can be switched between stored positions and blocked positions by moving the visor panel to block glare from vehicle windshield and side window.

9. A visor system of claim 8, wherein said first visor pivoting to side window and switching between stored position above side window and blocked position next to side window by flipping said visor panel of first visor to block glare from side window and said second visor switching between stored position above windshield and blocked position next to windshield by flipping said visor panel of second visor to block glare from windshield.

10. An adjustable visor system for a vehicle comprising:
  a visor having a support rod, wherein said support rod having flexible material to provide adjustments of said visor to desired positions to block glare from different angles whereby said adjustable visor with said support rod made of flexible material can be adjusted to desired positions to block glare from different angles.

11. An adjustable visor system of claim 10, wherein part of said support rod is made of flexible material to provide adjustments of said visor to desired positions to block glare from different angles of vehicle window.

12. An adjustable visor system of claim 10, wherein whole said support rod is made of flexible material to provide adjustments of said visor to desired positions to block glare from different angles of vehicle window.

13. An adjustable visor system of claim 10, wherein multiple parts of said support rod are made of flexible material to provide adjustments on multiple parts of said support rod to different positions to block glare from different angles and locations of vehicle window.

14. An adjustable visor system of claim 10, wherein said visor having support rod and visor panel, and both said support rod and said visor panel having flexible material to provide flexible adjustments of said visor to desired blocked positions to block glare from different angles of vehicle window.

15. An adjustable visor system of claim 10, wherein adjustable visor system includes an adjustable visor system with single visor and adjustable visor system with a multitude of visors.

16. An adjustable visor system for a vehicle comprising:
   a. first visor having support rod wherein said support rod having flexible material to provide adjustments of said first visor to desired positions to block glare from different angles of vehicle window
   b. second visor having support rod with pivotal device on one end of the support rod, said pivotal device connecting to said first visor support rod to provide pivotal movements between windshield and side window, said support rod of second visor having flexible material to provide adjustments of said second visor to desired positions to block glare from different angles of vehicle window
   Whereby said second visor can be easily attached to said first visor with pivotal device and moved between the windshield and side window, and support rods of said first visor and said second visor made of flexible material to adjust to desired positions of windshield and side window to block glare from different angles of vehicle windshield and side window.

17. An adjustable visor system of claim 16, wherein part of first visor support rod and part of second visor support rod are made of flexible material to provide adjustments of first visor and second visor to desired positions to block glare from different angles of vehicle windshield and side window.

18. An adjustable visor system of claim 16, wherein whole support rod of said first visor and whole support rod of said second visor are made of flexible material to provide adjustments of first visor and second visor to desired positions to block glare from different angles of vehicle windshield and side window.

19. An adjustable visor system of claim 16, wherein multiple parts of first visor support rod and multiple parts of second visor support rod are made of flexible material to provide adjustments on said multiple parts of first visor support rod and multiple parts of second visor support rod to desired positions to block glare from different angles of vehicle windshield and side window.

20. An adjustable visor system of claim 16, wherein part of first visor support rod and visor panel and part of second visor support rod and visor panel are made of flexible material to provide adjustments of said first visor and said second visor to desired positions to block glare from different angles of vehicle windshield and side window.

21. An adjustable visor system of claim 16, wherein said pivotal device includes pivotal socket device and similar device to provide pivotal movements between windshield and side window.

22. An adjustable visor system of claim 16, wherein said pivotal device includes a hinge device and similar device to provide pivotal movements between windshield and side window.

23. An adjustable visor system of claim 16, wherein said pivotal device includes a circular device and similar device to provide pivotal movements between windshield and side window and said circular device includes open end circular device and non open end circular device.

24. An adjustable visor system of claim 16, wherein a support socket can be installed above side window so that said second visor can be attached into said support socket to keep said second visor in position.

* * * * *